US011770769B2

(12) United States Patent
Priyanto et al.

(10) Patent No.: US 11,770,769 B2
(45) Date of Patent: Sep. 26, 2023

(54) WAKE-UP SIGNAL TRANSMISSION ON RELAYING LINKS

(71) Applicant: SONY CORPORATION, Tokyo (JP)

(72) Inventors: Basuki Priyanto, Lund (SE); Olof Zander, Sodra Sandby (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 595 days.

(21) Appl. No.: 16/611,198

(22) PCT Filed: May 12, 2017

(86) PCT No.: PCT/EP2017/061515
§ 371 (c)(1),
(2) Date: Nov. 5, 2019

(87) PCT Pub. No.: WO2018/206124
PCT Pub. Date: Nov. 15, 2018

(65) Prior Publication Data
US 2020/0163017 A1 May 21, 2020

(51) Int. Cl.
*H04W 52/02* (2009.01)
*H04W 88/04* (2009.01)

(52) U.S. Cl.
CPC ....... *H04W 52/0229* (2013.01); *H04W 88/04* (2013.01)

(58) Field of Classification Search
CPC ... H04W 52/0229; H04W 88/04; Y02D 30/70
See application file for complete search history.

(56) References Cited

U.S. PATENT DOCUMENTS

| 2005/0238044 | A1* | 10/2005 | Osterloh | H04Q 9/00 370/460 |
| 2011/0255454 | A1 | 10/2011 | Hauser et al. | |
| 2014/0161010 | A1 | 6/2014 | Merlin et al. | |
| 2016/0150507 | A1 | 5/2016 | Kim et al. | |
| 2016/0204847 | A1* | 7/2016 | Ryu | H04W 64/006 455/7 |
| 2016/0227463 | A1* | 8/2016 | Baligh | H04W 28/0278 |
| 2016/0278147 | A1 | 9/2016 | Adrangi et al. | |
| 2017/0013553 | A1* | 1/2017 | Huang | H04W 52/0209 |

(Continued)

FOREIGN PATENT DOCUMENTS

| CN | 102696275 A | 9/2012 |
| CN | 104205993 A | 12/2014 |

(Continued)

OTHER PUBLICATIONS

International Search Report and Written Opinion from corresponding Application No. PCT/EP2017/061515 dated Feb. 8, 2018, 13 pages.

(Continued)

*Primary Examiner* — Michael K Phillips
(74) *Attorney, Agent, or Firm* — TUCKER ELLIS LLP

(57) ABSTRACT

Transmission of at least one first wake-up signal to a communication device (103) is triggered on a direct link (181) between a network (100) and the communication device (103). Transmission of at least one second wake-up signal to the communication device (103) is triggered on a relaying link (182) between the network (100) and the communication device (103).

20 Claims, 14 Drawing Sheets

(56) References Cited

U.S. PATENT DOCUMENTS

| | | | | |
|---|---|---|---|---|
| 2017/0048918 | A1* | 2/2017 | Iwamura | H04W 24/08 |
| 2018/0263058 | A1* | 9/2018 | Yang | H04W 74/0825 |
| 2019/0327679 | A1* | 10/2019 | Gupta | H04W 76/28 |
| 2019/0357143 | A1* | 11/2019 | Wang | H04W 52/0229 |
| 2020/0053647 | A1* | 2/2020 | Chae | H04W 56/001 |
| 2020/0077338 | A1* | 3/2020 | Sui | H04W 52/0229 |

FOREIGN PATENT DOCUMENTS

| | | |
|---|---|---|
| CN | 106537813 B | 5/2019 |
| CN | 106576354 B | 3/2020 |
| EP | 2157824 A1 | 2/2010 |
| JP | 5467598 B2 * | 4/2014 |
| JP | 5467598 B2 | 4/2014 |
| WO | 2015020300 A1 | 2/2015 |
| WO | 2016120686 A1 | 8/2016 |
| WO | 2017055157 A1 | 4/2017 |
| WO | WO-2017196611 A1 * | 11/2017 |

OTHER PUBLICATIONS

Chinese Office Action dated Jul. 20, 2022 for Application Serial No. 201780091903 (5 pages).

Chinese Search Report dated Jul. 12, 2022 for Application Serial No. 201780091903 (2 pages).

Ericsson, 3GPP TSG RAN Meeting #74, "Motivation for New WI on Even Further Enhanced MTC for LTE," RP-162286, Vienna Austria, Dec. 5-8, 2016, Agenda item 10.1.1 (8 pages).

Qualcomm, 3GPP RAN #74, "Enhancements for Rel-15 eMTC/ NB-IoT," RP-162126, Vienna Austria, Dec. 2016 (8 pages).

Sony, 3GPP TSG RAN WG1#88, "Wake up Radio for NR," R1-1703139, Athens, Greece, Feb. 13-17, 2017 (3 pages).

* cited by examiner

WAKE-UP SIGNAL TRANSMISSION ON RELAYING LINKS

RELATED APPLICATION DATA

This application is a National Stage of International Application No. PCT/EP2017/061515, filed May 12, 2017.

TECHNICAL FIELD

Various examples generally relate to communication of wake-up signals. Various examples specifically relate to communication of wake-up signals on multiple communication links such as a direct link and a relaying link.

BACKGROUND

Wireless communication is an integral part of modern life. Reducing energy consumption of wireless communication is an important task to enable various applications such as Internet of Things (IOT) or Machine Type Communication (MTC).

One approach to reduce the energy consumption of wireless communication is to use wake-up techniques. Here, a terminal such as a user equipment (UE) may include two receivers, i.e., one main receiver and a low-power receiver. The low-power receiver may implement a comparably simple architecture and, therefore, may consume less power during operation than the main receiver. The low-power receiver can be activated when the main receiver has transitioned into an inactive state. Then, the low-power receiver can receive the wake-up signal and, in response to receiving the wake-up signal, the main receiver can transition again to the active state. Payload data may be transmitted and/or received (communicated) by the main receiver.

Example implementations are described by Third Generation Partnership Project (3GPP) TSG RAN Meeting #74 contribution RP-162286 "Motivation for New WI on Even further enhanced MTC for LTE"; 3GPP TSG RAN Meeting #74 contribution RP-162126 "Enhancements for Rel-15 eMTC/NB-IoT"; and 3GPP TSG RAN WG1 #88 R1-1703139 "Wake Up Radio for NR".

However, such reference implementations face certain restrictions and drawbacks. For example, it is possible that the sensitivity of the low-power receiver—e.g., due to its simplified architecture—is comparably low. Therefore, it is possible that a wake-up signal transmitted by a base station (BS) is not easily received by the UE. In other words: the coverage for transmission of wake-up signals may be comparably small.

SUMMARY

Therefore, a need exists for advanced techniques of communicating wake-up signals. In particular, a need exists for such techniques which enable communication of wake-up signals with enhanced coverage.

This need is met by the features of the independent claims. The features of the dependent claims define embodiments.

A method comprises triggering transmission of at least one wake-up signal to a communication device on a relaying link between a network and the communication device.

A computer program product comprises program code executable by at least one processor. Executing the program code causes the at least one processor to perform a method. The method comprises triggering transmission of at least one wake-up signal to a communication device on a relaying link between a network and the communication device.

A computer program comprises program code executable by at least one processor. Executing the program code causes the at least one processor to perform a method. The method comprises triggering transmission of at least one wake-up signal to a communication device on a relaying link between a network and the communication device.

A device comprises control circuitry configured to trigger transmission of at least one wake-up signal to a communication device on a relaying link between a network and the communication device.

A method comprises a communication device receiving at least one wake-up signal from a further communication device on a relaying link between a network and the communication device.

A computer program product comprises program code executable by at least one processor. Executing the program code causes the at least one processor to perform a method. The method comprises a communication device receiving at least one wake-up signal from a further communication device on a relaying link between a network and the communication device.

A computer program comprises program code executable by at least one processor. Executing the program code causes the at least one processor to perform a method. The method comprises a communication device receiving at least one wake-up signal from a further communication device on a relaying link between a network and the communication device.

A communication device comprises control circuitry configured to receive at least one wake-up signal from a further communication device on a relaying link between a network and the communication device.

A method comprises a communication device relaying at least one wake-up signal to a further communication device on a relaying link between a network and the further communication device.

A computer program product comprises program code executable by at least one processor. Executing the program code causes the at least one processor to perform a method. The method comprises a communication device relaying at least one wake-up signal to a further communication device on a relaying link between a network and the further communication device.

A computer program comprises program code executable by at least one processor. Executing the program code causes the at least one processor to perform a method. The method comprises a communication device relaying at least one wake-up signal to a further communication device on a relaying link between a network and the further communication device.

A communication device comprises control circuitry configured to relay at least one wake-up signal to a further communication device on a relaying link between a network and the further communication device.

By such techniques, it is possible to enhance the coverage when communicating wake-up signals. For example, if the UE cannot be reached on the direct link, the UE may still be reached on the relaying link. This facilitates more reliable wake-up of the UE.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
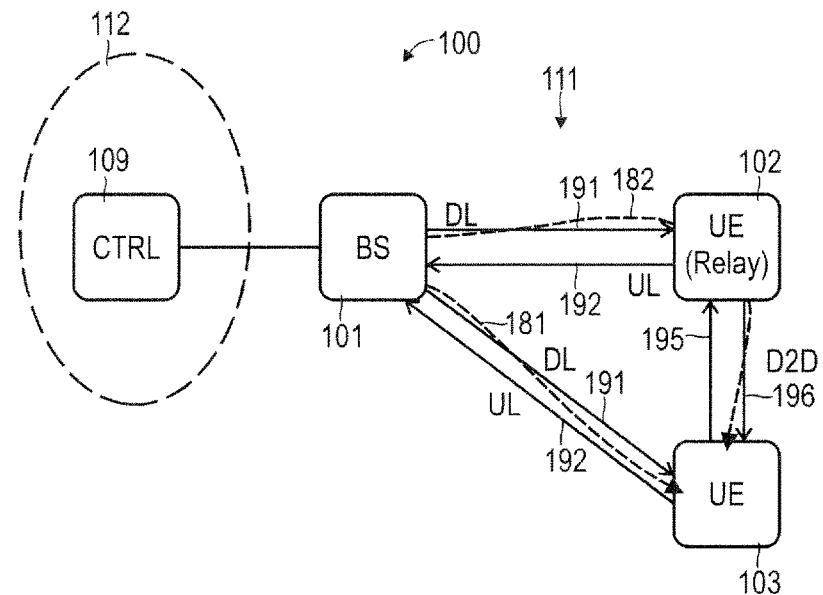
FIG. 1 schematically illustrates a network including a BS, a UE implementing relay functionality, and a further UE according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, wake-up techniques are described. The wake-up techniques enable a UE to transition a main receiver into a low-power state, e.g., for power-saving purposes. In some examples, the low-power state of the main receiver may be an inactive state.

The inactive state can be characterized by a significantly reduced power consumption if compared to an active state of the main receiver. For example, the main receiver may be unfit to receive any data in the inactive state such that some or all components may be shut down. Wake-up of the main receiver from the inactive state is then triggered by a wake-up signal.

The wake-up signal may be received by a dedicated low-power receiver of the UE. The wake-up signal may have a comparably simple modulation, e.g., On-Off Keying or the like, which facilitates a simple time-domain operation by the low-power receiver.

It is expected, but not required that the power consumption consumed by the low-power receiver when receiving the wake-up signal is lower than the power consumption consumed by the main receiver when receiving signals from the BS.

In other examples, the wake-up signal may be received by the main receiver in the low-power state. Here, it may not be required to provision a dedicated low-power receiver.

Since it is expected that the power consumption is lower when using a wake-up signal compared to ordinary main receiver signal reception, one typical implementation aspect is that a battery powered UE can be configured to listen for wake-up signals more often than for paging signals. In this manner, for a given energy consumption the time granularity for reaching a UE via paging can be improved using wake-up signal.

Various techniques described herein are based on the finding that a low-power receiver or, generally, the low-power receiver functionality that is typically used for receiving a wake-up signal may have certain design constraints to achieve low power consumption. These design constraints can often result in a lower sensitivity. Therefore, the signal-to-noise ratio required for successful reception by the low-power receiver or, generally, the low-power receiver functionality may be more challenging if compared to conventional communication techniques, e.g., employed using the main receiver of the UE. Hence, an increased time granularity for reachability is often achieved with the cost of a reduced coverage, meaning that UEs having transitioned into an inactive state where they rely on the low-power receiver or a low-power receiver functionality sometimes will not be able to detect wake-up signals transmitted by the network on a direct link.

Various techniques described herein enable coverage enhancement when communicating wake-up signals. This is achieved by triggering transmission of multiple wake-up signals via different communication links between a network and a UE. In some examples, wake-up signals may be communicated from the network to the UE via, both, a direct link and a relaying link or, alternatively solely via the relaying link. The direct link may enable direct reception of the wake-up signals which have been transmitted by a BS of the network; here no intermediate relaying nodes or hops are required. The relaying link may enable reception of the wake-up signals which have been relayed by one or more relay devices of the network. For example, single-hop or multi-hop relaying links may be employed for communicating wake-up signals in the various examples described herein. For example, for the 3GPP Long Term Evolution (LTE) communication system, it is known to utilize a relay-based connection between a remote node—e.g., implemented by a UE or a stationary relay—and a BS of the network; i.e., it is possible to implement communication on a relaying link. In comparison to communication on a direct link between the UE and the BS, communication on the relaying link extends via a relay device.

The relay device may be implemented by a further UE. Then, the relay-based link may be facilitated by device-to-device (D2D) communication. Corresponding functionalities are, e.g., described in 3GPP Technical Specification (TS) 23.303 V14.0.0 (2016-09), section 4.5.4. Sometimes, the relay functionality of the relay device is implemented on Internet Protocol (IP) level, i.e., the relay device made substantially act as an IP router. However, there have been other proposals to implement relay functionality on lower protocol layers, e.g., Layer 2 or Layer 3 of a transmission protocol stack according to the Open Systems Interface (OSI) model.

The techniques described herein may find application in various fields. An example application relates to IOT UEs. Such IOT UEs often communicate uplink (UL) or downlink (DL) data only once or a few times per day or even per week. The remaining time is idle. In an idle mode, a discontinuous reception (DRX) cycle can be used to repeatedly activate a main receiver to receive paging indicators from the network. In some examples, the main receiver may be operated persistently in an inactive state and, instead, a low-power receiver or, generally, low-power receiver functionality may be used to receive wake-up signals. Also in such scenarios a DRX cycle may be employed. Thereby, the battery life of the IOT UEs may be significantly prolonged.

Another example application relates to vehicle-to-vehicle (V2V) communication, where e.g. the relaying device is a device that relates to the vehicle communication. Such device may be a vehicle such as a car or bus, or it may be an infrastructure device related to V2V such as a road sign device or similar.

FIG. 1 schematically illustrates a network 100 according to various examples. The network 100 includes a BS 101. A relay UE 102 and a remote UE 103 are attached to the network 100. Such a network 100 may be employed in the various examples disclosed herein, e.g., for communicating wake-up signals.

A radio interface 111 is implemented between the BS 101 and, both, the relay UE 102 and the UE 103.

DL communication 191 from the BS 101 to the relay UE 102, as well as UL communication 192 from the relay UE 102 to the BS 101 are implemented on the radio interface 111. Further, DL communication 191 from the BS 101 to the UE 103, as well as UL communication 192 from the UE 103 to the BS 101 are implemented on the radio interface 111. Payload data and/or control data can be transmitted via respective communication 191, 192. Further, as illustrated in FIG. 1, D2D communication 195, 196 can be implemented on the radio interface 111 between the relay UE 102 and the remote UE 103. Payload data and/or control data can be transmitted via respective D2D communication 195, 196. The resources for the D2D communication 195, 196 may be allocated by the relay UE 102 and/or by the BS 101. For example, the BS 101 may provide a set of candidate resources to the relay UE 102 and the relay UE 102 may then schedule D2D communication 195, 196 in some or all of the candidate resources.

DL data and/or UL data may be communicated between the BS 101 and the UE 103 via a relaying link 182 and/or a direct link 181. Thus, the UE 102 provides relaying functionality for the relaying link 182. The UE 102 acts as a relay for the relaying link 182. The UE 102 is, thus, sometimes referred to as relaying UE 102. There may be multiple relaying links 182 between the network 100 and the UE 103 if there are multiple UEs providing relaying functionality.

Generally, in the various examples disclosed herein, the relaying link may be a link including at least one relaying node. A relaying node, e.g., the UE 102, is typically a node in the signal path between the BS 101 and the UE 103 or, generally, a source node and a destination node, that is configured to receive, demodulate and decode data, apply error correction and then re-transmit a new signal to the destination node. Re-transmitting may include adding error protection, e.g., a checksum, modulation and/or coding of data.

FIG. 1 also illustrates a CN 112 of the network 100 (core network; CN). The CN 112 includes a control node 109. The control node 109 may keep track of the mobility of the relay UE 102 and/or of the mobility of the remote UE 103. For example, the control node 109 may keep track of the particular cell/BS to which the relay UE 102 and the remote UE 103 are connected. Furthermore, it is possible that the control node 190 keeps track of the particular power-saving mode in which the relay UE 102 and the remote UE 103 are operating. For example, the control node 102 can keep track of certain parameters of a DRX cycle is employed by the relay UE 102 and/or the remote UE 103 to implement power saving. The control node 102 can keep track of the timing of the DRX cycle employed by the relay UE 102 and/or of the DRX cycle employed by the remote UE 103.

Figure 2:
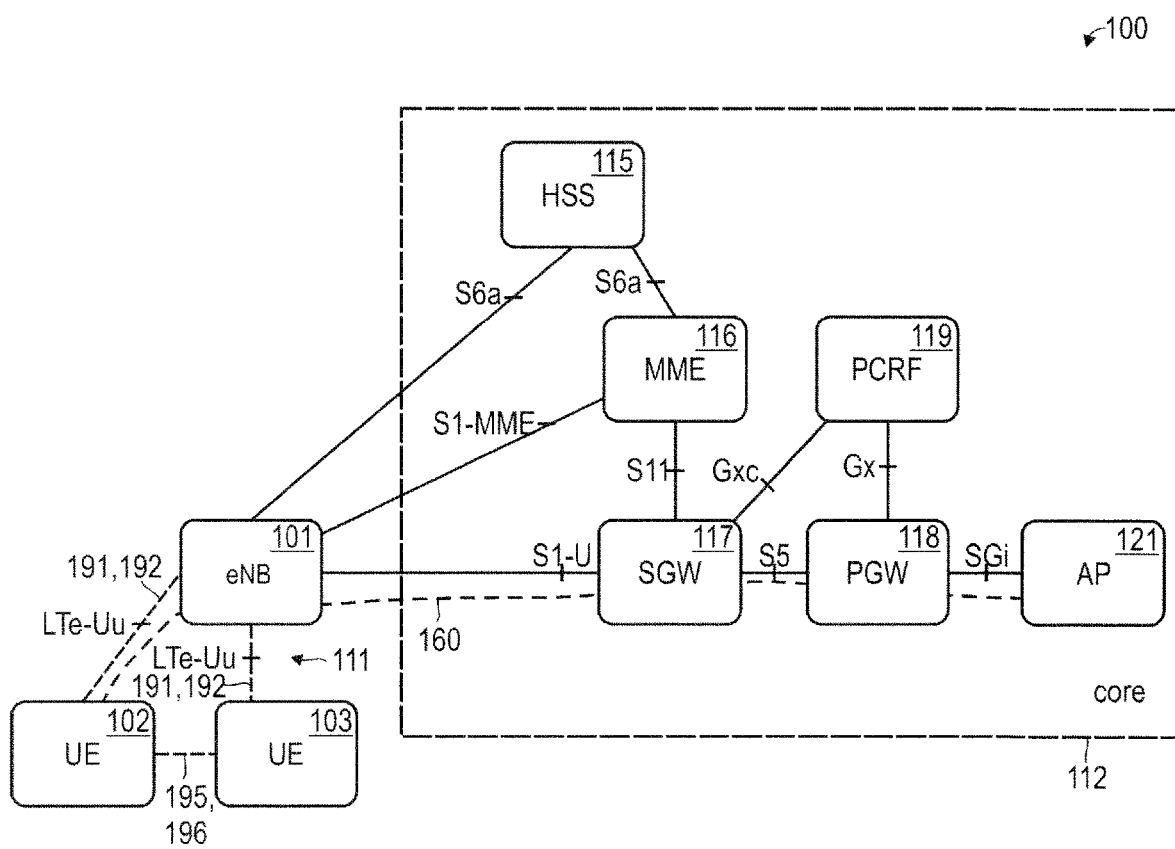
FIG. 2 schematically illustrates a network including a BS, a UE implementing relay functionality, and a further UE according to various examples.

FIG. 2 illustrates aspects with respect to the network 100. Such a network 100 may be employed in the various examples disclosed herein, e.g., for communicating wake-up signals.

FIG. 2 illustrates further details with respect to the architecture of the network 100. The network 100 according to the example of FIG. 2 implements the 3GPP LTE architecture. According to 3GPP LTE, a radio interface 111 is defined in a radio access network (RAN). The radio interface 111 is defined between a BS in the form of an evolved node B (eNB) 101 and one or more UEs 102, 103. The direct link 181 and the relay link 182 are not illustrated in FIG. 2 for simplicity.

The illustration of the network 100 in FIG. 2 in the 3GPP LTE framework is for exemplary purposes only. Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA). For example, the techniques described herein may be applied to the 3GPP eNB-IoT or MTC systems or 3GPP New Radio (NR) systems. See, for example, 3GPP RP-161321 and RP-161324. Furthermore, respective techniques may be readily applied to various kinds of non-3GPP-specified networks, such as Bluetooth, satellite networks, IEEE 802.11x Wi-Fi technology, etc.

The network 100 includes a CN 112. The CN 112—the evolved packet core (EPC) in 3GPP LTE—is in communication with the RAN. The CN 112 includes a control layer and a data layer. The control layer includes control nodes such as the home subscriber server (HSS) 115, the mobile management entity (MME) 116, and the policy and charging rules function (PCRF) 119. The data layer includes gateway nodes such as the serving gateway (SGW) 117 and the packet data network gateway (PGW) 118.

For example, the MME 116 controls CN-initiated paging of the UEs 102, 103 if the respective UE 102, 103 operates in RRC idle mode. The MME 116 may keep track of the timing of the DRX cycle of the UE 102 and/or of the DRX cycle of the 103. For example, the MME 116 may be part of establishing a data connection 160. The MME 116 may trigger transmission of wake-up signals and/or of paging signals by the BS 101.

The data connection 160 is established if the respective UE 102, 103 operates in RRC connected mode. To keep track of the current state of the UEs 102, 103, the MME 116 sets the UE 102, 103 to ECM connected or ECM idle. During ECM connected, a non-access stratum (NAS) connection is maintained between the UE 102, 103 and the MME 116. The NAS connection implements an example of a mobility control connection.

The general functioning and purpose of the network nodes 115-119, 121 of the CN 112 is well known in the art such that a detailed description is not required in this context.

Figure 3:
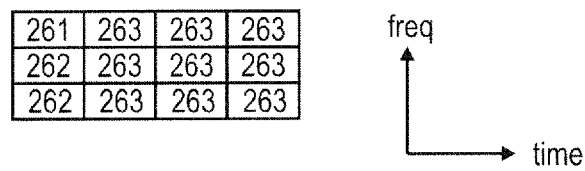
FIG. 3 schematically illustrates time-frequency resources of a time-frequency resource grid, the resources being allocated to different channels according to various examples.

The data connection 160 is established between the UE 102 via the radio access network (RAN) and the data layer of the CN 112 and towards an access point 121. The data connection 160 may be established on the direct link 181 or the relaying link 182. For example, a connection with the Internet or another packet data network can be established via the access point 121. To establish the data connection 160, it is possible that the respective UE 102, 103 performs a random access (RACH) procedure, e.g., in response to reception of network paging or network wake-up. A server of the packet data network or the Internet may host a service for which payload data is communicated via the data connection 160. The data connection 160 may include one or more bearers such as a dedicated bearer or a default bearer. The data connection 160 may be defined on the RRC layer, e.g., generally Layer 3 of the OSI model of Layer 2. Establishing of the data connection 160 may thus include OSI Network layer control signaling. By means of the data connection 160, time-frequency resources may be allocated on payload channels such as the Physical UL Shared Channel (PUSCH) and/or the Physical DL Shared Channel (PDSCH) to facilitate transmission of payload data. A control channel such as the Physical DL Control Channel (PDCCH) can facilitate transmission of control data. Also a Physical UL Control Channel (PUCCH) can be implemented. FIG. 3 illustrates time-frequency resources allocated to different communication channels 261-263 in a time-frequency grid.

FIG. 3 illustrates aspects with respect to channels 261-263 implemented on the radio interface 111. The radio interface 111 implements a plurality of communication channels 261-263. Transmission frames—e.g., implemented by sub-frames—of the channels 261-263 occupy a certain time duration. Each channel 261-263 includes a plurality of resources which are defined in time domain and frequency domain. For example, the resources may be defined with respect to symbols encoded and modulated according to Orthogonal Frequency Division Multiplexing (OFDM).

For example, a first channel 261 may carry wake-up signals. The wake-up signals enable the network 100—e.g., the MME 116—to page the UE 103 when the UE 103 is in a respective idle mode. The wake-up signals may thus be communicated in dedicated resources of the channel 261.

A second channel 262 may carry paging signals or paging indicators which enable the network 100—e.g., the MME 116—to page the UE 103 when the UE 103 is in a respective idle mode. The paging signals or paging indicators may thus be communicated in dedicated resources of the channel 262.

As will be appreciated from the above, the wake-up signals and the paging signals may be different from each other in that they are transmitted on different channels 261, 262.

Further, a third channel 263 is associated with a payload messages carrying higher-layer user-plane data packets associated with a given service implemented by the UE 103 and the BS 101 (payload channel 263). User-data messages may be transmitted via the payload channel 263. According to the E-UTRAN RAT, the payload channel 263 may be the PDSCH or the PUSCH. Alternatively, control messages may be transmitted via the channel 263, e.g., a paging message.

Figure 4A:
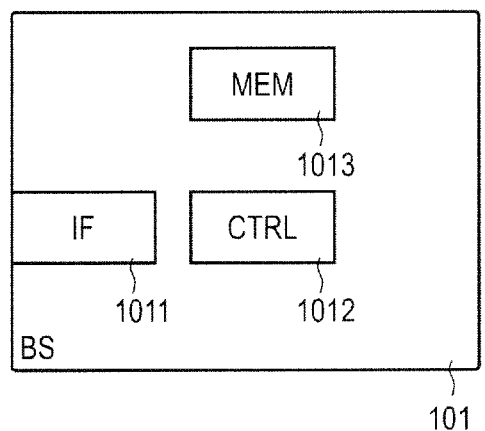
FIG. 4A schematically illustrates a BS according to various examples.

FIG. 4A schematically illustrates the BS 101. The BS 101 includes an interface 1011. For example, the interface 1011 may include an analog front end and a digital front end. The BS 101 further includes control circuitry 1012, e.g., implemented by means of one or more processors and software. For example, program code to be executed by the control circuitry 1012 may be stored in a non-volatile memory 1013. In the various examples disclosed herein, various functionality may be implemented by the control circuitry 1012, e.g. transmitting wake-up signals via a direct link and/or a relaying link; configuring transmission of the wake-up signals via different communication links; etc.

Figure 4B:
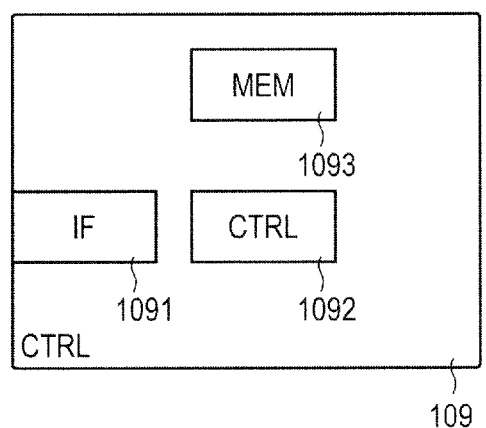
FIG. 4B schematically illustrates a core network control node according to various examples.

FIG. 4B schematically illustrates the control node 109, e.g., implementing the MME 116. The control node 109 includes an interface 1091. The control node 109 further includes control circuitry 1092, e.g., implemented by means of one or more processors and software. For example, program code to be executed by the control circuitry 1092 may be stored in a non-volatile memory 1093. In the various examples disclosed herein, various functionality may be implemented by the control circuitry 1092, e.g. triggering transmission wake-up signals via a direct link and/or a relaying link; configuration transmission of the wake-up signals via different communication links; etc.

Figure 5A:
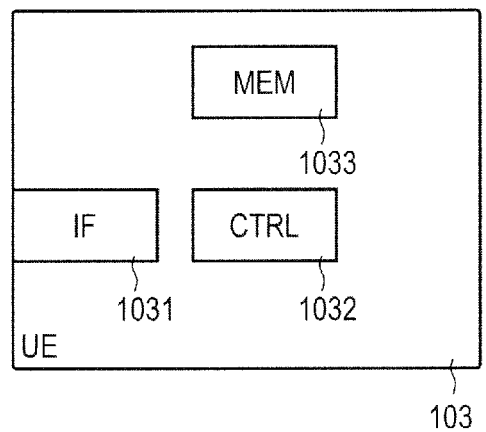
FIG. 5A schematically illustrates a UE according to various examples.

FIG. 5A schematically illustrates the UE 103. The UE 103 includes an interface 1031. For example, the interface 1031 may include an analog front end and a digital front end. In some examples, the interface 1031 may include a main receiver and a low-power receiver. Each one of the main receiver and the low-power receiver may include an analog front end and a digital front end, respectively. The UE 103 further includes control circuitry 1032, e.g., implemented by means of one or more processors and software. The control circuitry 1032 may also be at least partly implemented in hardware. For example, program code to be executed by the control circuitry 1032 may be stored in a non-volatile memory 1033. In the various examples disclosed herein, various functionality may be implemented by the control circuitry 1032, e.g. receiving wake-up signals; transitioning the main receiver between an inactive state and an active state; implementing a DRX cycle of the main receiver and/or of the low-power receiver; providing prioritization of communication links for reception of the wake-up signals; etc.

Figure 5B:
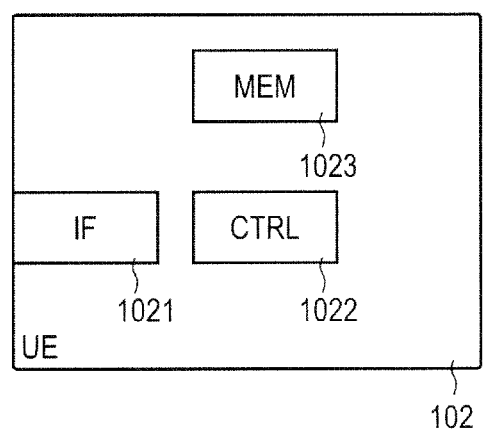
FIG. 5B schematically illustrates a UE according to various examples.

FIG. 5B schematically illustrates a relay device, implemented in this example by the UE 102. Hence, the UE 102 is configured to provide relaying functionality. The UE 102 includes an interface 1021. For example, the interface 1021 may include an analog front end and a digital front end. In some examples, the interface 1021 may include a main receiver and a low-power receiver. Each one of the main receiver and the low-power receiver may include an analog front end and a digital front end, respectively. The UE 102 further includes control circuitry 1022, e.g., implemented by means of one or more processors and software. The control circuitry 1022 may also be at least partly implemented in hardware. For example, program code to be executed by the control circuitry 1022 may be stored in a non-volatile memory 1023. In the various examples disclosed herein, various functionality may be implemented by the control circuitry 1022, e.g. relaying wake-up signals; participating in D2D communication; relaying data on a relaying link; participating in D2D discovery; etc.

Figure 6:
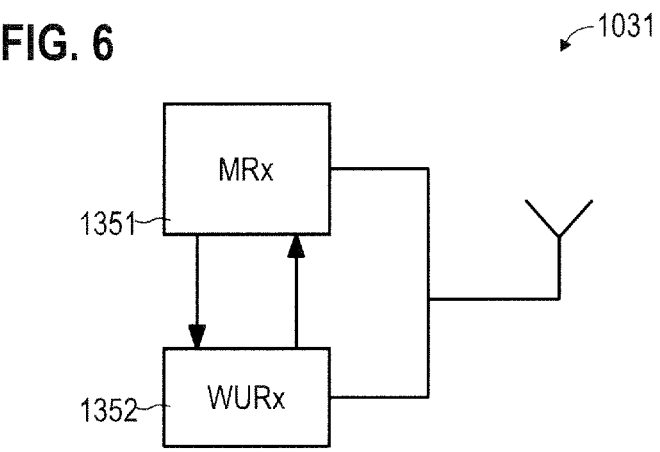
FIG. 6 schematically illustrates a main receiver and a low-power receiver of a UE according to various examples.

FIG. 6 illustrates details with respect to the interface 1031 of the UE 103. In particular, FIG. 6 illustrates aspects with respect to a main receiver 1351 and a low-power receiver 1352. In FIG. 6, the main receiver 1351 and the low-power receiver 1352 are implemented as separate entities. For example, they may be implemented on different chips. For example, they may be implemented in different housings. For example, they may not share a common power supply.

The scenario FIG. 6 may enable switching off some or all components of the main receiver 1351 when operating the main receiver in inactive state. In the various examples described herein, it may then be possible to receive wake-up signals using the low-power receiver 1352.

Figure 7:
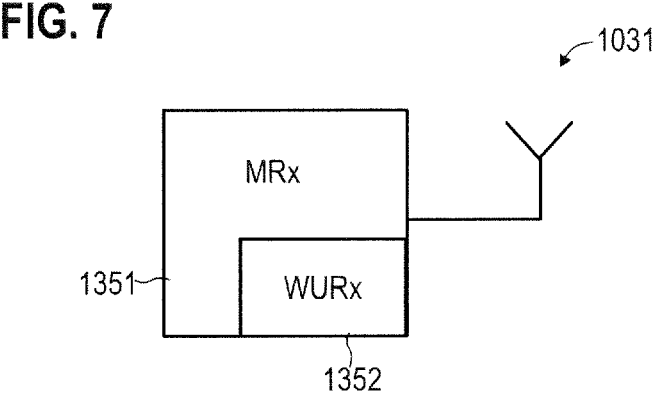
FIG. 7 schematically illustrates a main receiver end a low-power receiver of a UE according to various examples.

FIG. 7 illustrates details with respect to the interface 1031 of the UE 103. In particular, FIG. 7 illustrates aspects with respect to the main receiver 1351 and the low-power receiver 1352. In FIG. 7, the main receiver 1351 and the low-power receiver 1352 are implemented as a common entity. For example, they may be implemented on the common chip, i.e., integrated on a common die. For example, they may be implemented in a common housing. For example, they may share a common power supply.

The scenario FIG. 7 may enable a particular low latency for transitioning between reception—e.g., of a wake-up signal—by the wake-up receiver 1352 and reception by the main receiver 1351.

While in FIGS. 6 and 7 a scenario is illustrated where the main receiver 1351 and the low-power receiver 1352 share a common antenna, in other examples, it would be also possible that the interface 1031 includes dedicated antennas for the main receiver 1351 and the low-power receiver 1352.

While in the examples of FIGS. 6 and 7 scenarios are illustrated where there is a dedicated low-power receiver 1352, in other examples there may be no low-power receiver. Instead, the wake-up signal may be received by the main receiver 1351 in a low-power state. For example, the main receiver 1351 may not be fit to receive ordinary data other than the wake-up signal in the low-power state. Then, in response to receiving the wake-up signal, the main receiver 1351 may transition into a high-power state in which it is fit to receive the ordinary data, e.g., on PDSCH or PDCCH, etc.

Figure 8:
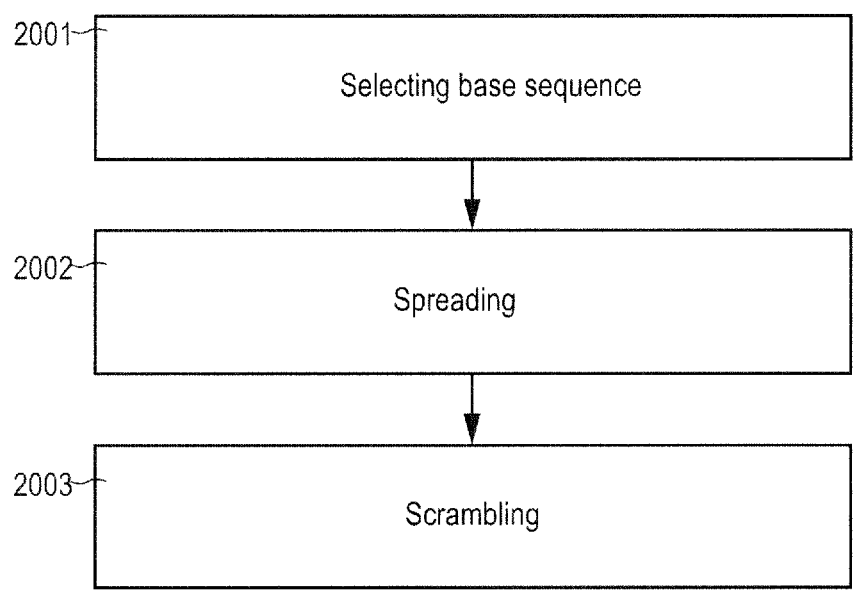
FIG. 8 is a flowchart of a method according to various examples, wherein the method of FIG. 8 relates to generating a symbol sequence of a wake-up signal.

FIG. 8 is a flowchart of a method according to various examples. FIG. 8 illustrates aspects with respect to constructing the wake-up signal. For example, the method according to FIG. 8 could be executed by the control circuitry 1012 of the BS 101. FIG. 8 illustrates aspects with respect to a sequence design of the wake-up signal. In the various examples described herein, it may be possible to construct the wake-up signals according to the method of FIG. 8.

First, a certain base sequence is selected, 2001. For example the base sequence may be a randomly generated set of bits. For example the base sequence may be unique for a UE or a group of UEs. For example, the base sequence may be selected from the group including: a Zadoff-Chu sequence; a sequence selected from a set of orthogonal or quasi-orthogonal sequences; and a Walsh-Hadamard sequence. For example, selecting the particular base sequence or type of base sequence can be subject to sequence design of the wake-up signal. For example, setting the sequence length of the base sequence of the wake-up signal can be subject to sequence design of the wake-up signal.

In some examples, different base sequences may be selected for different wake-up signals. In particular, the base sequence may be selected based on an intended recipient of the wake-up signal, i.e., depending on the particular UE 103 to which the wake-up signal is to be transmitted. In other words, it may be possible that the base sequence is uniquely associated with the respective UE 103 as the intended recipient of the wake-up signal. Different UEs may be addressed by different base sequences. Hence, the base sequence may also be referred to as identity code.

Next, spreading may be applied to the base sequence, 2002. When spreading a bit sequence, the incoming bit sequence is spread/multiplied with a spreading sequence. This increases the length of the incoming bit sequence by a spreading factor K. The resulting bit sequence can be of the same length as the incoming bit sequence times the spreading factor. Details of the spreading can be set by a spreading parameter. For example, the spreading parameter may specify the spreading sequence, e.g., a length of the spreading sequence or individual bits of the spreading sequence. Setting the spreading parameter can be subject to sequence design of the wake-up signal.

Then, scrambling may be applied to the spread base sequence, 2003. Scrambling may relate to inter-changing or transposing a sequence of the bits of the incoming bit sequence according to one or more rules. Scrambling provides for randomization of the incoming bit sequence. Based on a scrambling code, the original bit sequence can be reproduced at the receiver. Details of the scrambling can be set by a scrambling parameter. For example, the scrambling parameter can identify the one or more rules. For example, the scrambling parameter can relate to the scrambling code. Setting the scrambling parameter can be subject to sequence design of the wake-up signal.

In some examples, it may be possible to additionally add a checksum to the wake-up signal. Adding a checksum may be subject to sequence design of the wake-up signal. For example, a checksum protection parameter may set whether to include or to not include the checksum. For example, the checksum protection parameter may set a length of the checksum. For example, the checksum protection parameter may set a type of the checksum, e.g., according to different error-correction algorithms, etc.

In some examples, it may be possible to add a preamble to the wake-up signal. The preamble may include a sequence of preamble bits. For example, the sequence of preamble bits may have a specific length. The sequence of preamble bits may enable robust identification of the wake-up signal, e.g., even in presence of burst errors, etc. Presence of the preamble, length of the preamble, and/or type of the preamble sequence, etc. can be properties that can be set according to a preamble parameter in sequence design of the wake-up signal.

According to various examples described herein, one or more sequence design configurations of the method according to the example of FIG. 8 can be set differently for different communication links 181, 182 on which wake-up signals are communicated. For example, a spreading configuration and/or a scrambling configuration or the particular type of base sequence can be set differently for communication on the direct link 181 if compared for communication on the relaying link 182. Alternatively or additionally, the sequence design of the wake-up signal may be adjusted differently for different UEs.

Thus, as will be appreciated, there are many different configurations of the sequence design that may be appropriately determined for different communication links 181, 182. Examples include one or more of the following: (I) a variable UE identity number size for the network to select, with a specified given range [e.g. 10-100 bits]; (II) different sequence generator methods for the network to use, that can provide different levels of cross correlation properties, e.g. a set of randomly generated bits, Zadoff-Chu sequence generation, Walsh-Hadamard sequence generation, etc.; (Ill) a given range of spreading factors for the network to use; (IV) a selection of different methods for scrambling that the network may select to apply; (V) an option for the network to use additional set of CRC bits, and a range of number of CRC bits for reduced false alarm rates; (VI) an option for the network to include preamble bits, for better detection probability of the wake up sequence. The specification may include design method and range of number of bits for such preamble.

Figure 9:
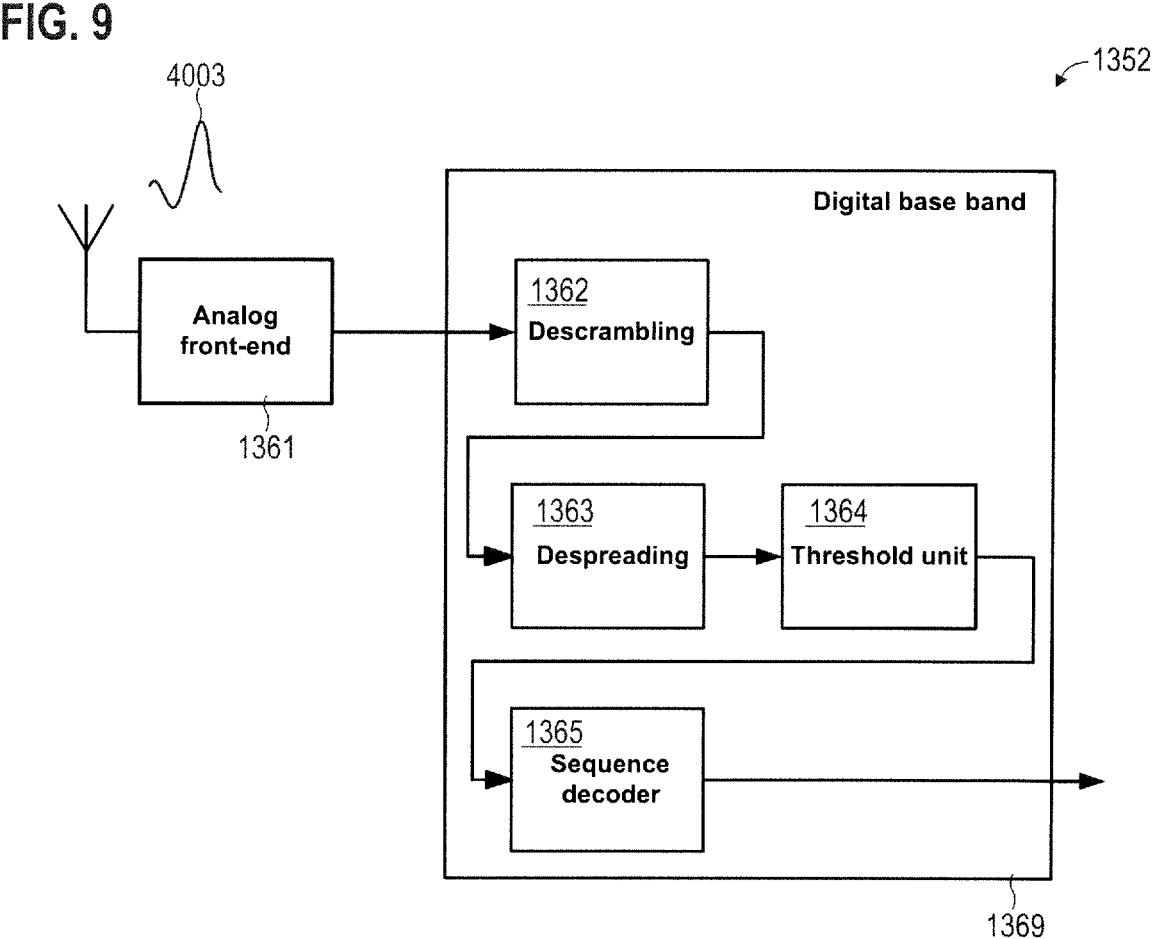
FIG. 9 schematically illustrates reception of a wake-up signal according to various examples.

FIG. 9 illustrates aspects with respect to the low-power receiver 1352. In the example of FIG. 9, the low-power receiver 1352 includes an analog front end 1361 and a digital front end 1369. In the various examples described herein, such a low-power receiver 1352 may be used in order to receive wake-up signals.

FIG. 9 illustrates aspects with respect to the processing of a wake-up signal 4003 received by the low-power receiver 1352. The analog front end 1361 outputs a bit sequence corresponding to the wake-up signal 4003 in the baseband to the digital front end 1369.

In the various examples described herein, time-domain and/or frequency-domain processing is employed to identify the wake-up signal 4003. Sometimes, respective processing may be with respect to a symbol sequence. Alternatively or additionally, respective processing may be with respect to a bit sequence. For example, processing may be with respect to a symbol sequence if the processing—e.g., correlation—is at the Fast Fourier Transform (FFT) output of the receiver. For example, processing may be with respect to a bit sequence if the processing—e.g., correlation—is after the demodulation output, e.g., after M-QAM or PSK output.

The processing of the wake-up signal by the digital front end 1369 may be comparably simple—e.g., if compared to processing of a paging indicator. In legacy LTE, once the UE is scheduled a paging occasion, i.e., allocated to listen to a paging indicator, the UE is expected to be ready to decode PDCCH. Thus, the paging signal may include a temporary identity such as the P-RNTI and a PDCCH checksum which is scrambled with P-RNTI. The paging indicator may be transmitted on the PDCCH. The PDCCH computation can be energy consuming, especially in MTC.

Differently, the wake-up signal may be transmitted independent of the PDCCH. Dedicated resources may be allocated to the wake-up signal. The wake-up signal may be transmitted prior to the UE accessing the PDCCH. Once the UE has detected a wake-up signal that is assigned to that UE, then the UE may start to decode the PDCCH.

The wake-up signal may be referred to as a simplified paging indicator, because it may only include the UE identity or group identity and the signals may be constructed a different ways.

The wake-up signal and the paging signal may employ different physical channels 261, 262. The wake-up signal may not include reference to the P-RNTI—included in the paging signal—for UE-specific identification. The wake-up signal may be designed so that it requires less UE computation/calculation than reception and decoding of the paging signal.

For example, with respect to the wake-up signal, it may not be preferred to have channel coding such turbo code, convolutional code, etc. The wake-up signal can be a robust signal, such that does not operate with higher order modulation. It can be a lower order modulation, such as On-Of-Keying (OOK), BPSK. The wake-up signal may employ a modulation scheme that has low peak to average power ratio property. The wake-up signal can be a random bits and/or sequence signal that can be unique that can be assigned to a UE or group of UEs.

De-scrambling functionality 1362 then performs de-scrambling.

Next, de-spreading functionality 1363 is applied.

A threshold unit 1364 is provided next.

A sequence decoder 1365 employs a decoding algorithm to the bit sequence. Finally, the base sequence employed at the transmitter is thus reassembled.

It is then possible to perform a cross-correlation between the base sequence and a reference sequence. If the cross correlation yields a significant result, it can be judged that the wake-up signal 4003 was addressed to the particular UE 130 and possibly further UEs. Based on said cross correlating, it is then possible to selectively transition the main receiver 1351 from an inactive state to an active state.

By means of spreading and/or scrambling of the base sequence, more reliable crosscorrelation can be performed. For example, by spreading the base sequence, a longer sequence is obtained for the wake-up signal 4003 transmitted over the air. Longer sequences generally are more robust to false positives when performing the crosscorrelation.

Figure 10:
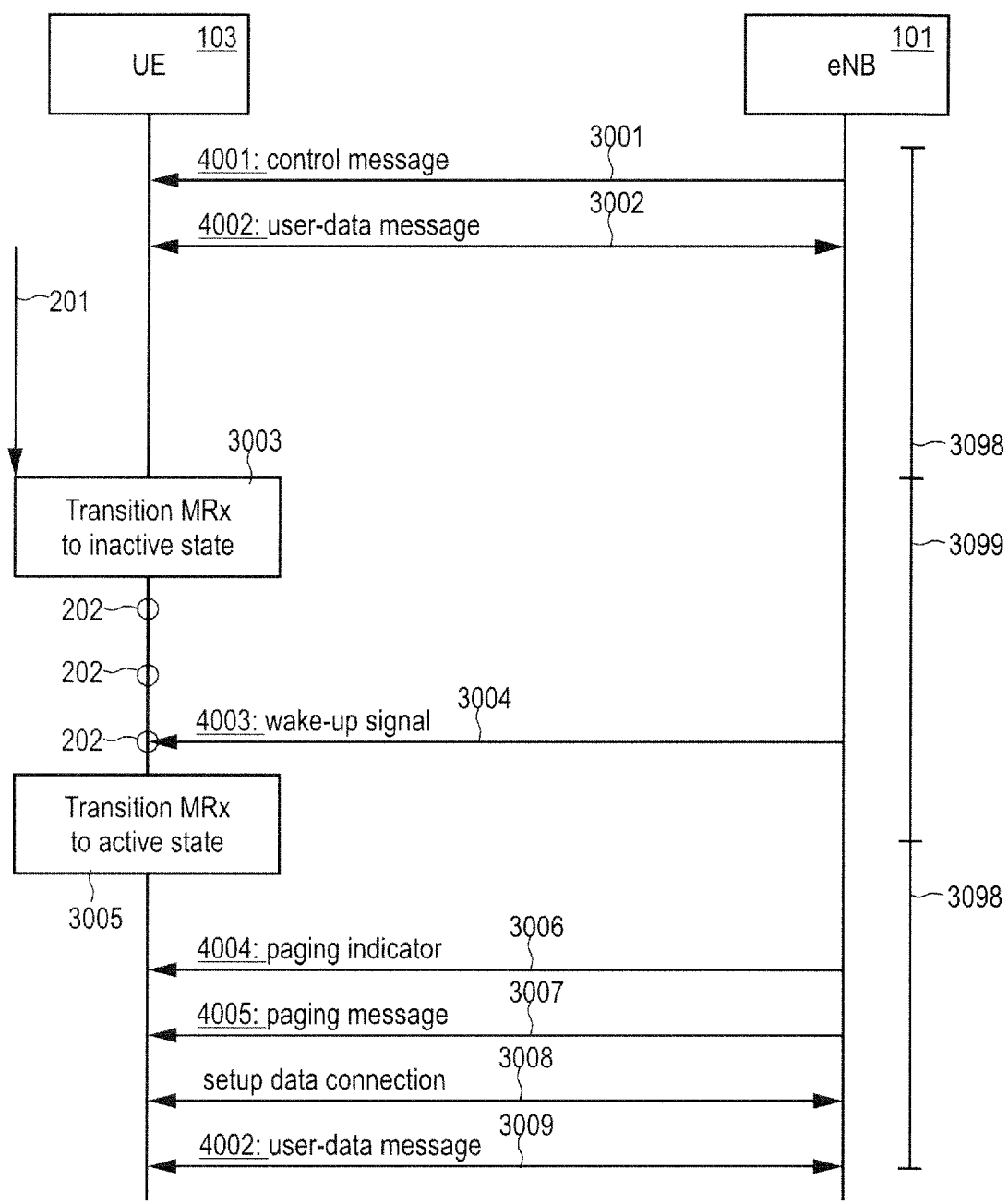
FIG. 10 is a signaling diagram illustrating communication of wake-up signals according to various examples.

FIG. 10 is a signaling diagram. FIG. 10 illustrates aspects with respect to communicating between the UE 103 and the BS 101. FIG. 10 illustrates aspects with respect to transmitting and/or receiving (communicating) a wake-up signal 4003. According to the various examples described herein, such techniques as described with respect to FIG. 10 may be employed for communicating wake-up signals 4003. In particular, FIG. 10 also illustrates aspects with respect to the inter-relationship between communication of a wake-up signal and communication of paging signals 4004, 4005 that may be employed in the various examples described herein.

At 3001, a control message 4001 is communicated. For example, the control message may be communicated on the control channel 262, e.g., PDCCH. For example, the control message may be a Layer 2 or Layer 3 control message. The control message may be relate to RRC/higher-layer signaling.

The control message 4001—which may be used in the various examples described herein—may be indicative of certain properties associated with the wake-up technology implemented by the UE 103. For example, the control message may configure an inactivity schedule 201 of the main receiver 1351 of the UE 103. For example, the control message 4001 may be indicative of a plurality of reoccurring resources allocated to the wake-up signal 4003. For example, the control message 4001 may be indicative of a modulation and/or coding scheme (MCS). For example, the control message 4001 may be indicative of the sequence design configuration of the wake-up signal 4003. For example, control message 4001 may be indicative the sequence ID of a UE or a group of UEs. For example, control message 4001 may be indicative the supported range/coverage of the wake-up radio mechanism, e.g., normal coverage or CE. For example, it may be possible that the control message 4001 is indicative of the sequence design configuration used for transmission of wake-up signals along different communication links 181, 182, e.g., along the direct link 181 vs. along the relaying link 182. By implementing the control message 4001 to be indicative of the sequence design configuration of the wake-up signal 4003, it is possible to dynamically adjust the sequence design configuration of the wake-up signal 4003, e.g., for communication of the wake-up signal along different communication links 181, 182. Certain properties of the direct link 181 and the relaying link 182 can be taken into account when determining the sequence design. Then, the UE 103 may be informed appropriately. By tailoring the wake-up signal 4003 to the communication link 181, 182, overhead can be avoided. For example, the CRC checksum may be reduced if the signal quality of the relaying channel 182 is higher that the signal quality of the direct channel 181.

It would be possible that the control message 4001 is communicated during an attach procedure of the UE 103 to the network 100. For example, the control message 4001 could be communicated while the data connection 160 is active. For example, the control message 4001 could be re-transmitted—e.g., indicating different values—from time to time. For example, it would be possible that the control message 4001 is broadcast by the BS 101 to multiple UEs. In some examples, it would also be possible that one or more properties are negotiated between the UE 103 and the BS 101; then, the control message 4001 may be communicated as part of such a bi-directional negotiation which may include further control messages (not shown in FIG. 10).

At 3002, a user-data message 4002 is communicated. For example, the user-data message 4002 may be communicated on the payload channel 263. For example, the user-data message 4002 may be communicated along the data connection 160, e.g., as part of a bearer, etc.

Then, there is no more data to be communicated between the UE 103 and the BS 101. Transmit buffers are empty. This may trigger a timer. For example, the timer may be implemented at the UE 103. After a certain timeout duration set in accordance with the inactivity schedule 201, the main receiver 1351 of the UE 103 is transitioned into the inactive state 3099 from the active state 3098, 3003. This is done in order to reduce the power consumption of the UE 103. For example, prior to the transitioning the main receiver 1351 to the inactive state 3099, it would be possible to release the data connection 160 by appropriate control signaling on the control channel 262 (not illustrated in FIG. 10). 4001 and 4002 are communicated with the main receiver 1351.

Multiple wake-up occasions for communicating the wake-up signal 4003 are then implemented by reoccurring resources 202. For example, the resources 202 may be radio resources defined in a time-frequency grid used for communication with the main receiver 1951; this avoids interference with further UEs communicating with the BS 101. For example, the resources 202 may correspond to resource blocks of the time-frequency resource grid, the blocks including multiple resource elements. For example, the resources 202 may correspond to resource elements of the time-frequency resource grid; a single resource element may be defined by a symbol modulated by a certain constellation. Hence, the resource element may occupy a frequency bandwidth which corresponds to the bandwidth of the corresponding subcarrier.

The reoccurring resources 202 may be arranged with a fixed periodicity. Generally, the reoccurring resources 202 may be arranged in accordance with a certain timing or frequency of occurrence. Frequency hopping is possible. For example, indication of the reoccurring resources may specify the timing or periodicity, the frequency and time offset. In some examples, the reoccurring resources 202 may be aligned with a DRX cycle of a respective mode according to which the UE 103 operates.

At some point in time, the BS 101 transmits a wake-up signal 4003, 3004. This may be because there is DL data—e.g., payload data or control data—scheduled for transmission to the UE 103 in a transmit buffer. Another trigger criteria for transmitting the wake-up signal 4003 are conceivable. The wake-up signal 4003 is received by the UE 103.

In response to receiving the wake-up signal 4003, the main receiver 1351 of the UE 103 is transitioned to the active state 3098, 3005.

Then, at 3006, a paging indicator 4004 is transmitted by the BS 101 to the UE 103.

The paging indicator 4004 is received by the main receiver 1351. For example, the paging indicator may be transmitted on channel 262, e.g. PDCCH. For example, the paging indicator may include a temporary or static identity of the UE 103. The paging indicator or may be indicative of a plurality of UEs, because the indicator may be derived from unique identities of the UEs such as the International Mobile Subscriber Identity (IMSI) or the like in an ambiguous manner. Examples of the identity of one or more UEs that may be included in paging indicator 4004 may include a Paging Radio Network Temporary Identifier (P-RNTI) in the 3GPP LTE framework. The P-RNTI may not refer to a particular UE, but to a group of UEs. The P-RNTI may be derived from the IMSI of the subscriber to be paged and constructed by the BS.

For example, in case the wake-up signal is already UE specific, this paging indicator may be just a control message and include Cell Radio Network Temporary Identifier (C-RNTI), e.g., instead of the P-RNTI. For example, it is possible that the paging indicator does not include a UE-specific indicator, but merely includes, e.g., a cell-specific indicator.

The paging indicator 4004 may also include information on a MCS used for communicating a paging message 4005 at 3007. The paging message 4005 may be communicated on a shared channel 263, e.g., PDSCH. Generally, the paging indicator 4004 and the paging message 4005 may be communicated on different channels. The paging message 4005 may be modulated and encoded according to the MCS indicated by the paging indicator 4004. Thus, it may be required that the UE 103 receives, firstly, the paging indicator 4004 and, secondly, the paging message 4005.

Then, at 3008, a data connection 160 is set up between the UE 103 and the BS 101. This may include a random access procedure and a Radio Resource Control (RRC) set up.

Finally, a UL or DL user-data message 4002 is communicated using the newly set up data connection 160 at 3009.

As will be appreciated from FIG. 10, upon transitioning the main receiver 1351 to the active state 3098 at 3005, the data connection 160 needs to be re-established. For this reason, the UE 103 operates in idle mode—when no data connection 160 is set up or maintained—during the inactive state 3099 of the main receiver 1351. However, in the various examples described herein, other implementations of the particular mode in which the UE 103 operates during the inactive state 3099 are conceivable.

Figure 11:
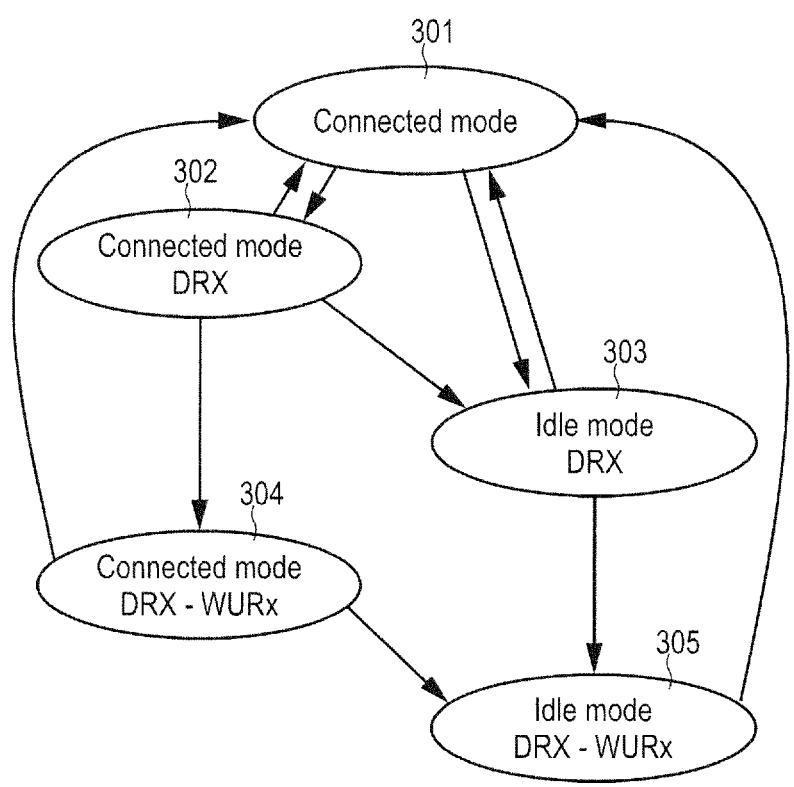
FIG. 11 schematically illustrates various modes in which a UE can operate according to various examples.

FIG. 11 illustrates aspects with respect to different modes 301-305 in which the UE 103 can operate. FIG. 11 also illustrates aspects with respect to association of communication of wake-up signals and paging signals with the various modes 301-305. In the various examples described herein, it is possible that the wake-up signals are communicated in certain operational modes 304, 305 of the UE 103. These modes 304, 305 may or may not be registered with the network 100.

During connected mode 301, a data connection 160 is set up. For example, a default bearer and optionally one or more dedicated bearers may be set up between the UE 103 and the network 100. In order to reduce the power consumption, it is then possible to transition from the connected mode 301 to a connected mode 302 which employs a DRX cycle of the main receiver 1351. The DRX cycle includes on durations and off durations. During the off durations, the main receiver 1351 is unfit to receive data. The timing of the DRX cycle is synchronized between the UE 103 and the BS 101 such that the BS 101 can align any DL transmission with the on durations of the connected mode DRX cycle. The bearer 160 is maintained set-up in mode 302.

To achieve a further power reduction, it is possible to implement in idle mode 303. The idle mode 303 is, again, associated with the DRX cycle of the main receiver 1351 of the UE 103. However, during the on durations of the DRX cycle in idle mode 303, the main receiver 1351 is only fit to receive paging indicators and, optionally, paging messages. For example, this may help to restrict the particular bandwidth that needs to be monitored by the main receiver 1351 during the on durations of the DRX cycles in idle mode 303. This may help to further reduce the power consumption—e.g., if compared to the connected mode 302.

In modes 301-303 the main receiver 1351 is operated in the active state 3098. The low-power receiver 1352 is not required.

In the example of FIG. 11, two more modes 304, 305 are illustrated. Both modes 304, 305 relate to scenarios where the main receiver 1351 is operated in the inactive state 3099. Hence, during the modes 304, 305, the main receiver 1351 is persistently switched off and, in particular, not switched on during any on durations. Differently, during the modes 304, 305, the low-power receiver 1352 is at least sometimes operating in an active state, e.g., according to a respective DRX cycle of the low power receiver 1352.

In mode 304, the data connection 160 is maintained between the UE 103 and the network 100. Transition into mode 304 may be determined by the inactivity schedule 201. In mode 304, it would be possible that a further signal which is communicated in response to communicating the wake-up signal directly encodes a user-data message associated with the data connection 160. No random access procedure is required. Thus, in such an example, the data connection 160 between the network 100 and the UE 100 may be established and the wake-up signal may then be communicated while the connection 160 is established. In such a scenario, the BS 101 may have to select between transmitting a DL scheduling grant indicative of resources allocated to a DL user-data message on the DL shared channel and transmitting the wakeup signal, depending on the inactivity schedule 201 of the main receiver 1251. The UE 103, in mode 304, is not required to repeatedly listen for DL control information (DCI). Mode 304 offers low latency transmission of payload data, possibly at the expense of more complicated book-keeping, e.g., by the BS 101.

Differently, in the mode 305, the data connection 160 is not maintained between the UE 103 and the network 100. A random access procedure, triggered by paging, may be required (cf. FIG. 10).

In the example of FIG. 11, scenarios are illustrated in which both low-power receiver modes 304, 305 implement a DRX cycle of the low-power receiver 1532. Hence, the wake-up signal 4003 is communicated in accordance with the timing of the DRX cycle. However, generally, it would also be possible to implement the modes 304, 305 such that the low-power receiver 1352 is persistently fit to receive wake-up signals, i.e., does not implement on durations and off durations.

Figure 12:
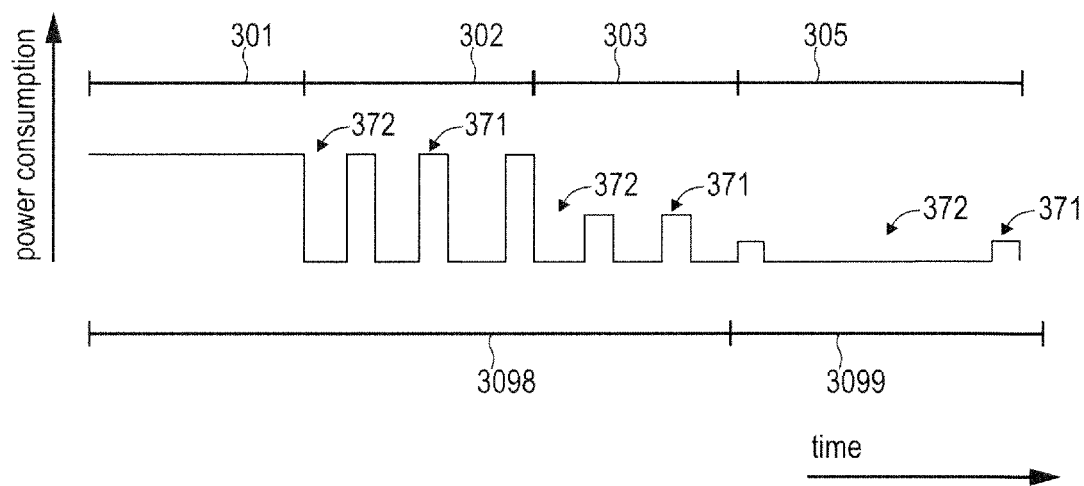
FIG. 12 schematically illustrates transitioning between various modes in which a UE can operate according to various examples and further illustrates power consumption associated with the various modes.

FIG. 12 illustrates aspects with respect to switching between the different modes 301-305. Furthermore, FIG. 12 illustrates aspects of employing DRX cycles. It is possible to employ such techniques in the various examples described herein with respect to communication of wake-up signals.

First, the UE 103 operates in the connected mode 301. This causes a persistent power consumption at a high level. Then, in order to reduce the power consumption, the connected mode 302 employing DRX is activated. Here, the on durations 371 and the off durations 372 of the main receiver 1351—operating in active state 3098—are illustrated.

To further reduce the power consumption, next, the idle mode 303 is activated. This is accompanied by releasing the data connection 160. Again, the idle mode 303 employs a DRX cycle including on durations 371 and off durations 372. The on durations 371 in mode 303 are associated with a lower power consumption if compared to the on durations 371 in connected mode 302, because in the idle mode 303, the capability of the main receiver 1351 can be reduced if compared to the connected mode 302. During idle mode 303, the main receiver 1351 only expects reception of paging signals.

Finally, to even further reduce the power consumption, the idle mode 305 is activated. Upon transitioning into the idle mode 305, the main receiver 1351 is transitioned from the active state 3098 to the inactive state 3099. A DRX cycle is again implemented including on durations 371 and off durations 372; here the on durations 371 define wake-up occasions.

Figure 13:
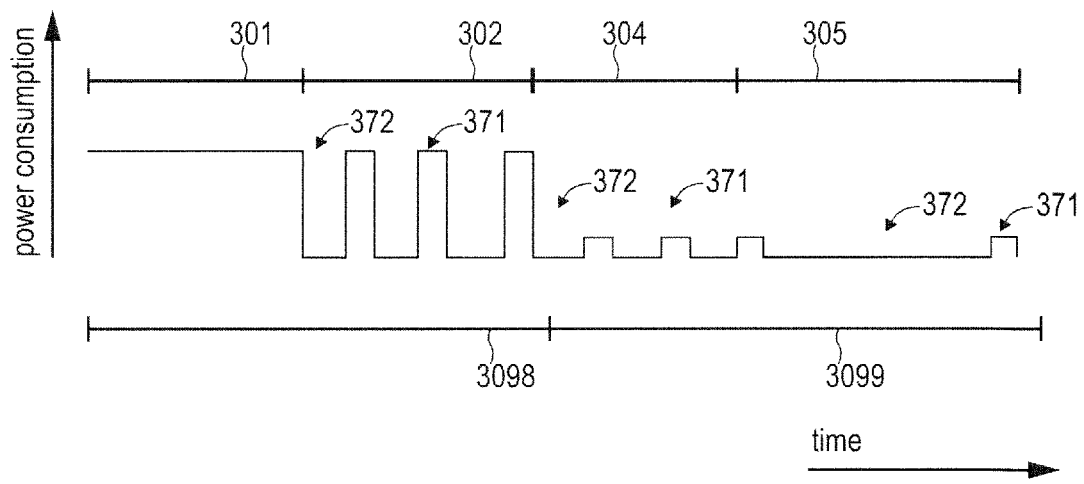
FIG. 13 schematically illustrates transitioning between various modes in which a UE can operate according to various examples and further illustrates power consumption associated with the various modes.

FIG. 13 illustrates aspects with respect to different modes 301-305 in which the UE 103 can operate.

The example of FIG. 13 generally corresponds to the example of FIG. 12. Here, instead of activating the idle mode 303, the connected mode 304 is activated. When operating the UE 103 in the connected mode 304, the data connection 160 is maintained, but the main receiver 1351 is transitioned into inactive mode 3099.

Figure 14:
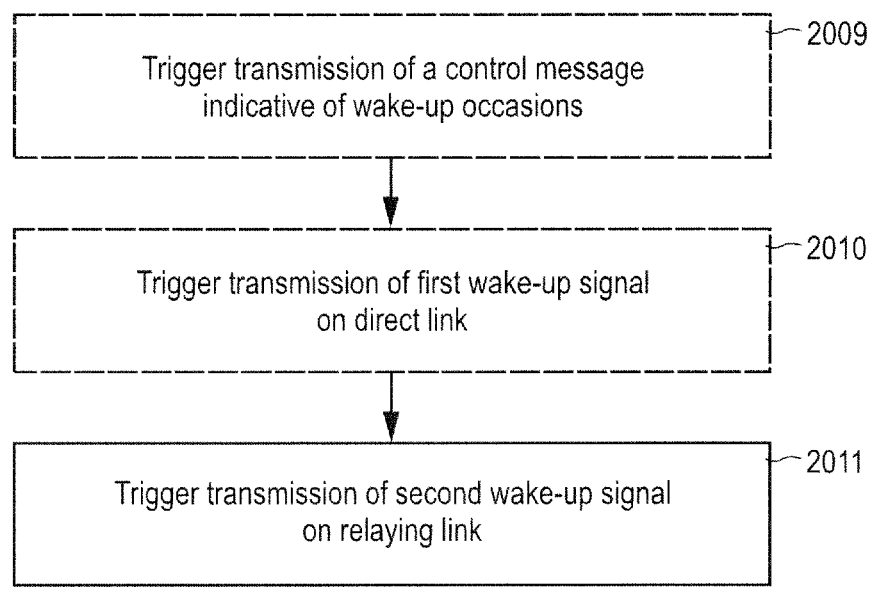
FIG. 14 is a flowchart of a method according to various examples.

FIG. 14 is a flowchart of a method according to various examples. For example, the method according to the example of FIG. 14 may be executed by the control circuitry 1012 of the BS 101 or, generally, a node of the RAN. It would also be possible that the method according to the example of FIG. 14 is executed by control circuitry of a control node 109 of the core network 112, e.g., by control circuitry of the MME 116. The method may also be executed by multiple nodes, e.g., the BS 101 in combination with the MME 116. The respective control circuitry may thus be configured to execute the method.

For example, the method of FIG. 14 may be executed when the UE 103 operates in one of the modes 304, 305, as illustrated above. For example, this may be triggered by the inactivity schedule 201, as illustrated above.

In 2009—which is an optional block—, transmission of a control message is triggered. The control message is transmitted to a UE. The control message is indicative of multiple wake-up occasions. The control message, in other words, may be indicative of a timing of a DRX cycle employed by the UE. Alternatively or additionally, the control message may be indicative of an inactivity schedule. Alternatively or additionally, the control message may be indicative of a signal configuration of the wake-up signal, e.g., a sequence design as explained with respect to FIGS. 8 and 9. In 2009, it would also be possible to implement a two-way negotiation of such parameters.

For example, the BS 101 may retrieve information (e.g., UE type, capability of UE 103) that can be relayed via UE 102. The BS 101 is also retrieving info/sensing that UE 102 can act as a relay UE for UE 103. Based on such information, the BS 101 may transmit the wake-up signal configuration to at least UE 102 or both UE 102 and UE 103.

In 2010—which is an optional block—, transmission of one or more first wake-up signals is triggered. In other words, sending of at least one first wake-up signal may be prompted. This may include control signaling between nodes of the network, e.g., the network 100 as explained in FIGS. 1 and 2. For example, this may include communication of a control message from the MME 116 to the BS 101. For example, this may include the transmission of the one or more first wake-up signals by the BS 101, e.g., using the interface 1011.

This transmission is triggered on a direct link between the network and a UE. The one or more first wake-up signals are DL signals which have the purpose of transitioning a main receiver of a UE from an inactive state to an active state. The one or more first wake-up signals are transmitted to a low-power receiver of the UE—e.g., the low-power receiver 1352 according to the examples of FIG. 6 or 7—and are for transitioning a main receiver of the UE—e.g., the main receiver 1351 according to the examples of FIG. 6 or 7—from an inactive state to an active state, e.g., active and inactive states 3098, 3099 as discussed above.

The transmission of the one or more first wake-up signals may be executed on the channel 261 according to the example of FIG. 261.

The transmission of the one or more first wake-up signals may use a sequence design as explained with respect to FIGS. 8 and 9.

In 2011, transmission of one or more second wake-up signals is triggered. This transmission is triggered on a relaying link between the network and the UE. In other words, sending of at least one second wake-up signal may be prompted. This may include control signaling between nodes of the network, e.g., the network 100 as explained in FIGS. 1 and 2. For example, this may include communication of a control message from the MME 116 to the BS 101. For example, this may include the transmission of the one or more second wake-up signals by the BS 101, e.g., using the interface 1011.

The one or more second wake-up signals are transmitted to a low-power receiver of the UE and are for transitioning a main receiver of the UE from an inactive state to an active state.

There may be different trigger criteria for executing 2011, i.e., for triggering transmission of the one or more second wake-up signals in 2011 via the relaying link. For example, the transmission via the relaying link 182 may be selectively triggered depending on one or more of the following: a geographical location of the UE; a quality of communicating on the relaying link and/or a quality of communicating on the direct link; and detection of a failed transmission attempt of the relaying signal on the direct link. For example, the UE 103 may detect and compare the packet error rate or signal-to-noise ration of direct link 181 and relaying link 182. The communication link 181, 182 having the better transmission reliability may be favored.

By using the relaying link, it can be possible to enhance the coverage for transmission of the wake-up signals.

Figure 15:
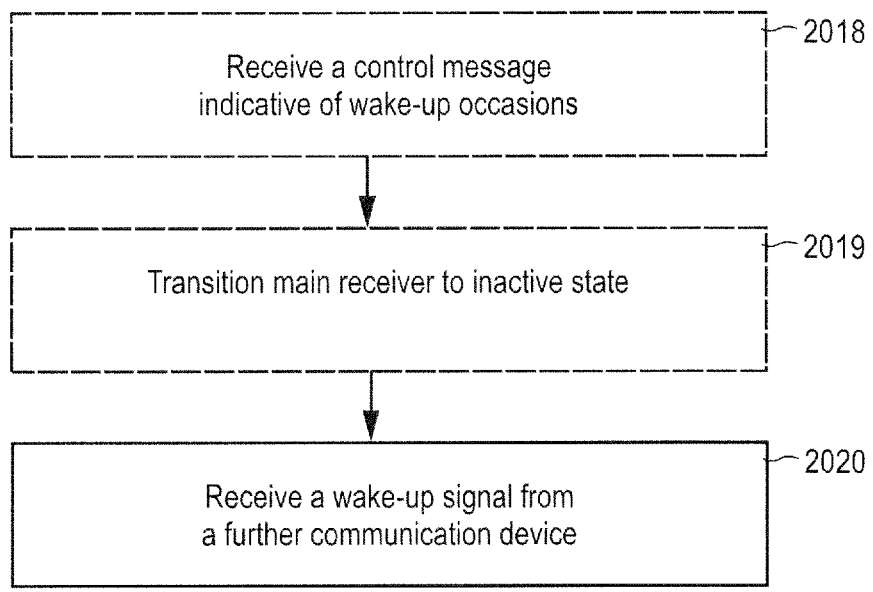
FIG. 15 is a flowchart of a method according to various examples.

FIG. 15 is a flowchart of a method according to various examples. For example, the method according to the example of FIG. 15 may be executed by the control circuitry 1032 of the UE 103. The control circuity 1032 may hence be configured to perform the method of FIG. 15.

In 2018—which is an optional step—, a control message is received. 2018 may be inter-related with 2009. The control message is indicative of multiple wake-up occasions. The control message, in other words, may be indicative of a timing of a DRX cycle employed by the UE. Alternatively or additionally, the control message may be indicative of an inactivity schedule. Alternatively or additionally, the control message may be indicative of a signal configuration of the wake-up signal, e.g., a sequence design as explained with respect to FIGS. 8 and 9. In 2009, it would also be possible to implement a two-way negotiation of such parameters.

In 2019—which is an optional step—, the main receiver of a UE is transitioned into an inactive state, e.g., the main receiver 1351 may be transitioned from the active state 3098 to the inactive state 3099. This may be according to an inactivity schedule, e.g., the inactivity schedule 201 as explained above.

In 2020, one or more wake-up signals are received from a further UE. The one or more wake-up signals are received on a relaying link. This may include decoding and/or demodulation of the one or more wake-up signals, e.g., according to a signal configuration indicated by the optional control message received in block 2018. In 2020, a DRX cycle may be employed, e.g., according to one of the operating modes 304, 305. This may be consistent with the wake-up occasions indicated by the optional control message of 2018.

The further UE implements relaying functionality, i.e., implements a relay device. In other words the wake-up signal is transmitted by a device which is capable of receiving DL signals from a BS. The wake-up signal is transmitted to a UE which is also capable of receiving DL signals from a BS. The relaying link may be referred to as any kind of communication which is connecting two such devices, and may for example be denoted as relayed communication, D2D communication in general, or specifically within D2D type of communication the vehicle-to-vehicle (V2V) communication or similar. The goal of V2V communication is to prevent accidents by allowing vehicles in transit to send position and speed data to one another over an ad hoc mesh network.

The one or more wake-up signals are DL signals which may be received by a low-power receiver of the UE have the purpose of transitioning the UE from an inactive state to an active state. For example, the method may further include, in response to receiving the wake-up signal: transitioning the main receiver from an inactive state to an active state.

Figure 16:
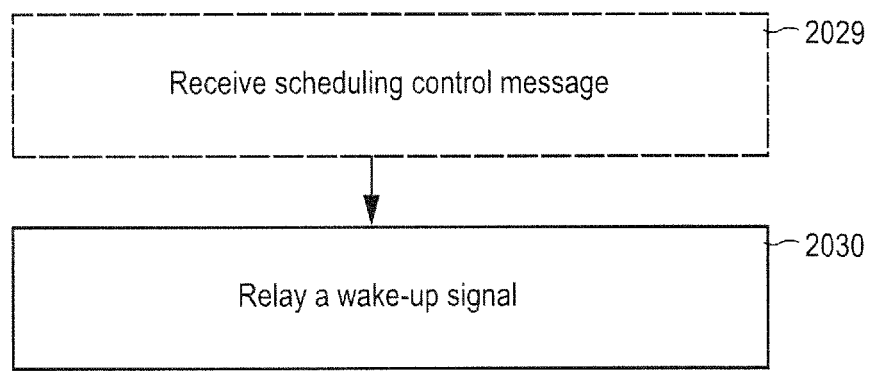
FIG. 16 is a flowchart of a method according to various examples.

By using the relaying link, it can be possible to enhance the coverage for transmission of the wake-up signals and/or to enhance the power consumption of D2D device. FIG. 16 is a flowchart of a method according to various examples. For example, the method according to the example of FIG. 16 may be executed by the control circuitry 1022 of the relay UE 102. Accordingly, the control circuitry 1022 may be configured to execute the method. Generally, the flowchart of the method according to the example of FIG. 16 may be executed by a relay device.

In 2029—which is an optional block—, a scheduling control message is received. The scheduling control message is indicative of reoccurring resources for multiple wake-up occasions. Alternatively or additionally, the scheduling control message could also be indicative of a signal configuration of the wake-up signals to be relayed.

In 2030, one or more wake-up signals are relayed on a relaying link between a network and a further UE. The one or more wake-up signals are DL signals which have the purpose of transitioning the main receiver of a further UE from an inactive state to an active state. For example, in 2030, a wake-up signal may be transmitted multiple times at the reoccurring resources as indicated by the scheduling control message of 2029.

Relaying the one or more wake-up signals can be implemented differently in different examples. In one example, relaying may include low-layer amplification of a received wake-up signal. Here, the wake-up signal including a pre-designed symbol sequence may be received and transmitted without any or significant modifications to the symbol sequence. In such an example, the relaying device need not to be information about the sequence design. In other examples, relaying may include receiving a scheduling control message, e.g., from a BS, e.g. in block 2029. The scheduling control message may be indicative of reoccurring resources for multiple wake-up occasions. Then, the method may further include relaying the at least one wake-up signal multiple times at the multiple wake-up occasions on the reoccurring resources indicated by the scheduling control message. In such a scenario it would be possible that the sequence design configuration the at least one wake-up signal (cf. FIG. 9) is included in the scheduling control message or in a further control message; the relaying UE may then execute sequence generation for the wake-up signal. Relaying may be different from repeating where a signal is simply amplified. Relaying may include delegating some tasks from the BS to the relay.

Figure 17:
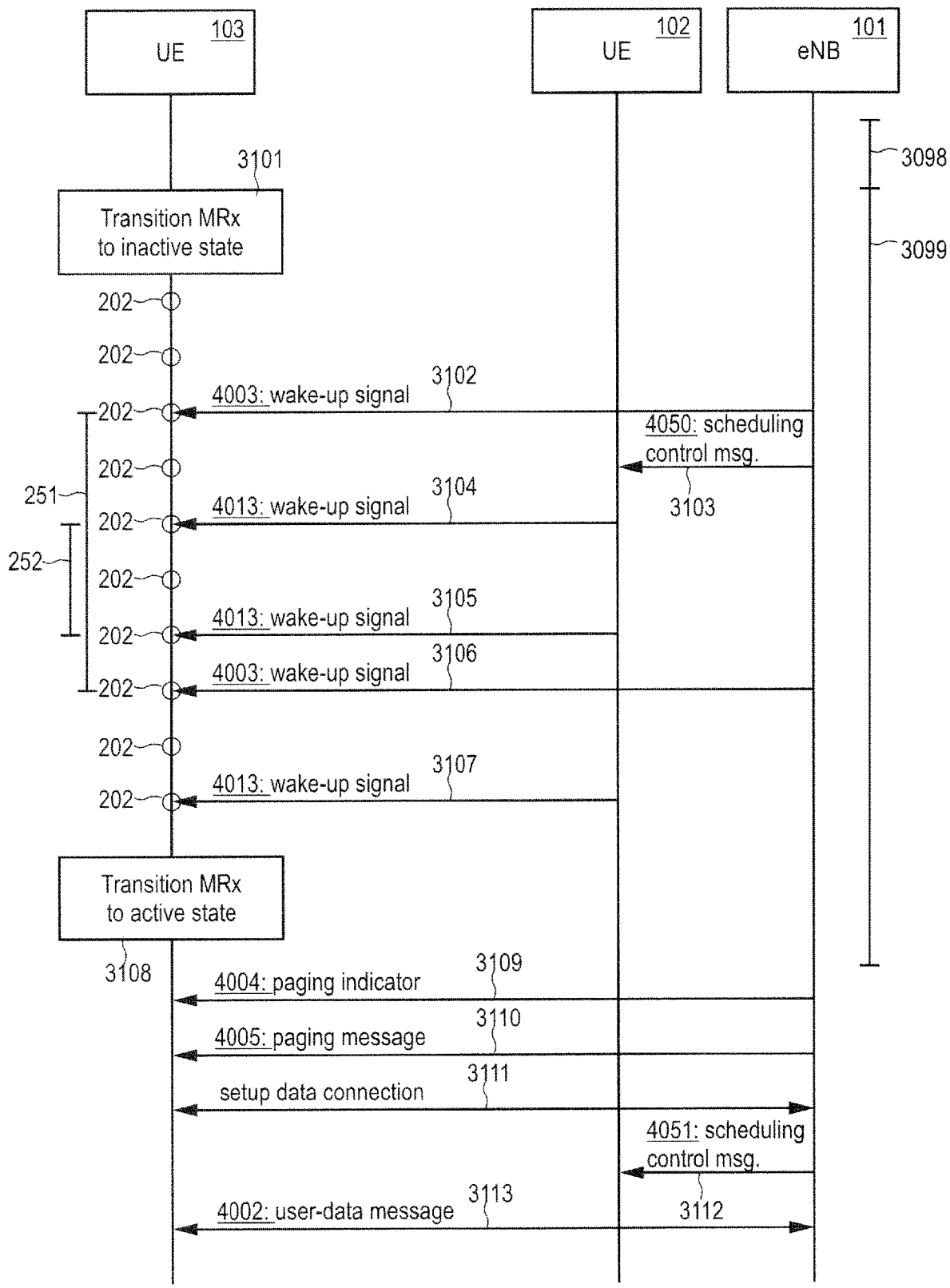
FIG. 17 is a signaling diagram illustrating communication of wake-up signals according to various examples, wherein in FIG. 17 wake-up signals are communicated on a direct link and a relaying link according to various examples.

FIG. 17 is a signaling diagram. FIG. 17 illustrates aspects with respect to communicating between the UE 103 and the BS 101. FIG. 17 illustrates aspects with respect to transmitting and/or receiving (communicating) a wake-up signal 4003. FIG. 17 also illustrates aspects with respect to relaying a wake-up signal 4013.

3101 corresponds to 3003. In FIG. 17, communication of a control message 4001, a user-data message 4002, and implementation of the inactivity schedule 201 has been omitted for sake of simplicity (cf. FIG. 10, 3001, 3002), but may be executed.

After the UE 103 has transitioned into the inactive state 3099, it implements a DRX cycle with multiple wake-up occasions at defined time-frequency resources 202.

In the example of FIG. 17, communication of wake-up signals 4003, 4013 is implemented on multiple communication links 181, 182. In particular, the wake-up signal 4003 is communicated on the direct link 181 between the BS 101 and the UE 103. Differently, the wake-up signal 4013 is communicated on the relaying link between the BS 101 and the UE 103 and via the UE 102.

At 3102, the BS 101 transmits a wake-up signal 4003 on the direct link 181; this may or may not be triggered by a CN control node 109, e.g., the MME 116. The wake-up signal 4003 transmitted at 3102 is not received by the UE 103. This may be due to different reasons. One scenario would be that the UE 103 is out of coverage. In particular, the coverage may be comparably limited when the UE 103 operates in the inactive state 3099; this may be due to a limited sensitivity of the low-power receiver 1352.

Generally, 3102 is optional. Hence, it may not be required that, at 3102, the BS 101 transmits the wake-up signal 4003 on the direct link. One scenario would be that the BS has a-priori knowledge about a low probability of UE being capable to receive a wake-up signal 4003 if transmitted on the direct link. By not transmitting the wake-up signal 4003 on the direct link BS, system signaling load can be reduced.

To mitigate this limited coverage, communication of the wake-up signal 4013 on the relaying link 182 is implemented. For this, a scheduling control message 4050 is transmitted by the BS 101 to the UE 102. This is on a backbone link between the BS 101 and the UE 102. Such backbone link between the BS 101 and the UE 102 may be a downlink control channel link. The scheduling control message 4050 is indicative of the reoccurring time-frequency resources 202 corresponding to multiple wake-up occasions.

The UE 102 then implements multiple transmissions of the wake-up signal 4013 at multiple wake-up occasions and on the reoccurring time-frequency resources 202 indicated by the scheduling control message 4050, 3104, 3105, 3107.

As will be appreciated from FIG. 17, by specifying the reoccurring time-frequency resources 202 corresponding to multiple wake-up occasions, the signaling overhead on the backbone link between the BS 101 and the UE 102 can be reduced; it is only required to communicate a single scheduling control message 4050 at 3103 for triggering the transmission of the multiple wake-up signals 4013 at 3104, 3105, 3107.

In the example of FIG. 17, also the wake-up signal 4003 is transmitted at multiple wake-up occasions by the BS 101 on the direct link 181. Time-division duplexing is implemented with respect to the communication of the wake-up signal 4003 and the wake-up signal 4013. This mitigates interference between the UE 102 transmitting the wake-up signal 4013 and the BS 101 transmitting the wake-up signal 4003.

The wake-up occasions at which the wake-up signal 4003 is transmitted and the wake-up occasions at which the wake-up signal 4013 is transmitted are interleaved in time domain. Thereby, the likelihood of the UE 103 timely receiving either the wake-up signal 4003 or the wake-up signal 4013 can be increased.

In the example of FIG. 17, the wake-up signal 4003 is transmitted with a certain periodicity 251; likewise, the wake-up signal 4013 is transmitted with a certain periodicity 252. Generally, it is not required that the wake-up signals 4003, 4013 are transmitted with a strict periodicity. It would be possible that a certain timing is implemented which provides for a frequency of occurrence of transmission of the respective wake-up signals 4003, 4013, e.g., having a certain variance. Here, the frequency of occurrence of the wake-up occasions at which the wake-up signal 4013 is transmitted may be larger than the frequency of occurrence of the wake-up occasions at which the wake-up signal 4003 is transmitted. This reduces the work load imposed on the BS 101. Furthermore, this is based on the finding that with respect to the limited sensitivity of the low-power receiver 1352, relay-mediated coverage enhancement can be desirable.

3108 again corresponds to 3005. 3901-3111 corresponds to 3006-3008, respectively. As will be appreciated, transmitting of the wake-up signal 4003, 4013 also triggers transmission off the paging indicator 4004 and the paging message 4005 (for sake of simplicity, in FIG. 17, the transmission of the paging indicator 4004 and the paging message 4005 is only illustrated for the transmission of the wake-up signal 4013 at 3107 which is successfully received by the UE 103 in which actually triggers the transition into the active state at 3108).

Once the BS 101 has received a response from the UE 103, e.g., as part of a random access procedure executed and 3111, a further scheduling control message 4051 is transmitted to the UE 102 which triggers the UE 102 to abort transmission of the wake-up signals 4013 at the reoccurring time-frequency resources that have been indicated by the scheduling control message 4050.

In FIG. 17, it would be possible that the wake-up signal 4003 has a different signal configuration if compared to the wake-up signal 4013. For example, the sequence design configuration may be different for the wake-up signal 4003 if compared to the wake-up signal 4013. For example, the signal configuration of the wake-up signal 4003 may be different from the signal configuration of the wake-up signal 4013 with respect to at least one element selected from the group including: identity code; preamble; sequence design configuration; spreading configuration; and scrambling configuration. By implementing the wake-up signals 4003, 4013 to have different signal configuration, it is possible to tailor the sequence design to the respective properties of the D2D communication 195, 196 used for transmitting the wake-up signal 4013 on the relaying link 182 and the direct communication 191, 192 used for transmitting the wake-up signal 4003 on the direct link 181. For example, the path loss may be larger for the direct communication 191, 192 if compared to the D2D communication 195, 196. This may warrant selecting a longer base sequence, or larger spreading factor, or using another modulation scheme, or modifying the channel coding parameters for the wake-up signal 4003 of compared for the wake-up signal 4013.

While in FIG. 17 the wake-up signals 4003 are also transmitted on the direct link, this is generally optional. It may not be required to transmit the wake-up signals 4003 on the direct link. This may reduce the workload imposed on the BS 101.

While in FIG. 17 a scenario is illustrated in which the paging indicator 4004 and the paging message 4005 are transmitted by the BS 101, in other examples it would be possible that the paging indicator 4004 and/or the paging message 4005 are transmitted by the UE 102. Likewise, it would be possible that the user-data message 4002 is relayed via the UE 102.

Figure 18:
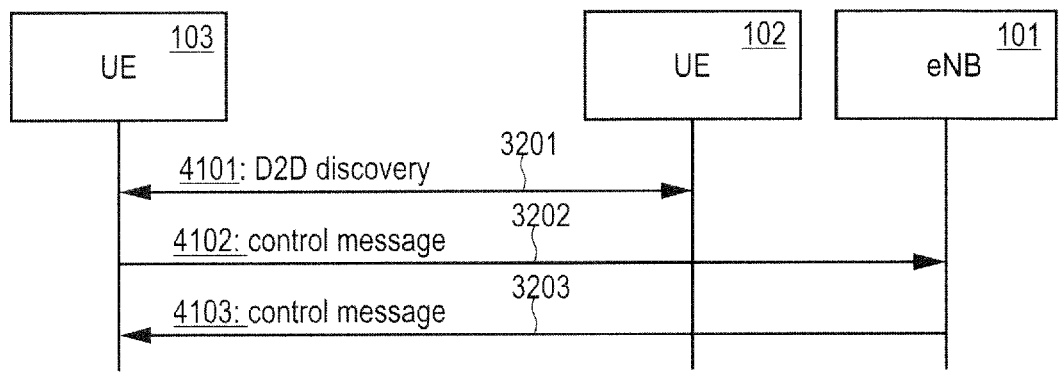
FIG. 18 is a signaling diagram illustrating communication of control messages according to various examples

FIG. 18 is a signaling diagram. FIG. 18 illustrates aspects with respect to communicating between the UE 103, the UE 102, and the BS 101. FIG. 18 illustrates aspects with respect to D2D discovery. For example, techniques according to FIG. 18 may be executed during a connection setup procedure of a data connection 160. For example, the techniques according to FIG. 18 may be re-executed from time to time. For example, the techniques according to FIG. 18 may be executed prior to 3101 in an active state 3098 of the UE 103.

In FIG. 18, the UE 103 and the UE 102 perform D2D discovery 4101 at 3201, i.e., detects each other using D2D communication 195, 196. Then, the UE 103 transmits a control message 4102 which is indicative of the UE 102. It is then possible that the BS 101 receives the control message 4102 which is indicative of the UE 102. The BS 101 may select the relaying link 182 from a plurality of candidate relaying links in accordance with the indication of the UE 102. For example, the candidate relaying links may be defined with respect to those UEs within a cell of the BS 101 also serving the UE 103 which are capable of implementing relaying functionality. Then, based on the D2D discovery 4101, those UEs may be identified which are in a close vicinity of the UE 103.

The control messages 4102, 4103 may be relayed via the UE 102.

In the illustrated example, the control message 4102 is transmitted by the UE 103. In other examples, it would also be possible that the UE 102 detects the UE 103 using D2D communication and indicates this to the network 100 in a respective control message. This also helps to identify those UEs which are in a close vicinity of the UE 103.

The BS 101 then transmits a control message 4103 to the UE 103, 3203. This is optional. The control message 4103 may be indicative of one or more time-frequency resources 202 at which the UE 103 should listen for wake-up signals; i.e., the control message 4103 may be indicative of one or more wake-up occasions. For example, the control message 4103 may be indicative of reoccurring time-frequency resources 202, i.e., of a timing of the wake-up occasions. Alternatively or additionally, the control message 4103 may also be indicative of a signal configuration of the wake-up signals that should be expected by the UE 103. This may be helpful for decoding/demodulating the received wake-up signals. This may be helpful for reconstructing the base sequence, e.g., to check whether the wake-up signal 4003, 4013 was indeed directed to the UE 103 based on the respective identity code.

Sometimes, the UE 103 may directly configure the UE 102 with the reoccurring resources 202 using the D2D communication 195, 196. This may reduce workload imposed on the BS 101, because the BS 101 does not have to signal the wake-up occasions to the UE 103. Such D2D communication 195, 196 may also be used to signal the signal configuration of the wake-up signals.

Figure 19:
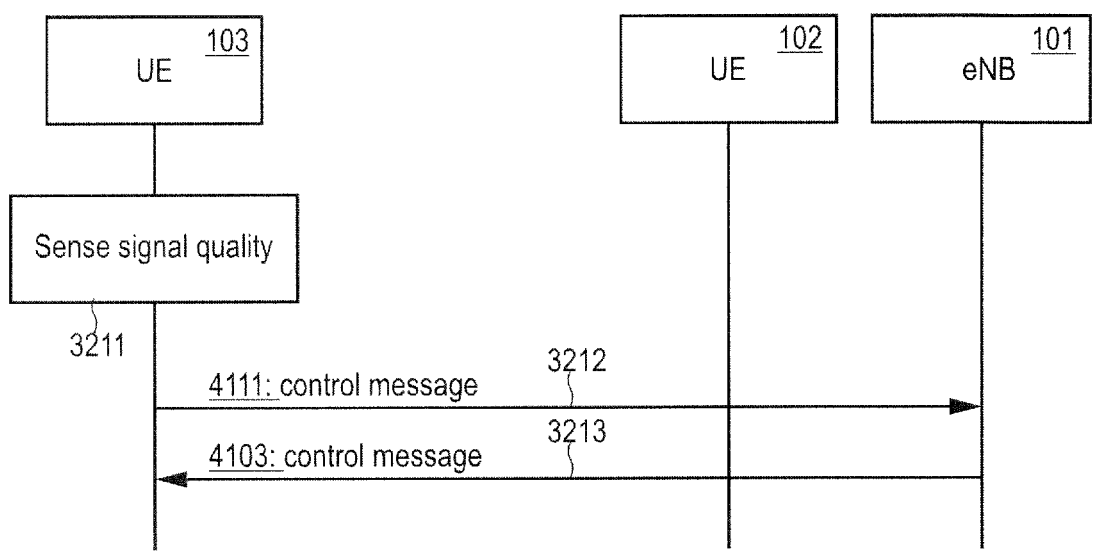
FIG. 19 is a signaling diagram illustrating communication of control messages according to various examples.

FIG. 19 is a signaling diagram. FIG. 19 illustrates aspects with respect to communicating between the UE 103 and the BS 101. FIG. 19 illustrates aspects with respect to the prioritization of communication links 181, 182. For example, techniques according to FIG. 19 may be executed during a connection setup procedure of a data connection 160. For example, the techniques according to FIG. 19 may be re-executed from time to time. For example, the techniques according to FIG. 19 may be executed prior to 3101 in an active state 3098 of the main receiver 1351 of the UE 103.

In FIG. 19, the UE 103 senses a signal quality of the D2D communication 195, 196 between the UE 103 and the UE 102. Alternatively or additionally, the UE 103 may sense a signal quality of direct communication 191, 192 between the UE 103 and the BS 101. Then, based on the signal quality, the UE 103 transmits a control message 4111 which is indicative of a prioritization of communication links 181, 182 between the network and the UE. The prioritization may be indicative of a preference of the UE 103 with respect to the reception of the wake-up signals 4003, 4013 on the direct link 181 versus on the relaying link 182.

The BS 101 receives the control message 4111. Based on the indicated prioritization, the BS may determine a timing of the transmission of the wake-up signal 4003 communicated on the direct link 181 and a timing of the transmission of the wake-up signal 4013 communicated on the relaying link 182. For example, based on the indicated prioritization, the BS 101 may determine the periodicities 251, 252. For example, if the signal quality of communicating on the direct link 181 is comparably high, the UE 103 may indicate a prioritization of the direct link 181; then, the periodicity 251 may be set to a comparably short value such that the wake-up signal 4003 is communicated on the direct link 181 comparably often. Differently, if the signal quality of communicating on the direct link 181 is comparably low, the UE 103 may indicate a prioritization of the relaying link 182; then, the periodicity 252 may be set to a comparably short value such that the wake-up signal 4013 is communicated on the relaying link 182 comparably often.

In the example of FIG. 19, the UE 103 transmits to control message 4111 which is indicative of the prioritization that has been determined based on the signal quality sensed in 3211. In other examples, it would also be possible that the UE 103 transmits a control message to the BS 101 which is indicative of the raw signal quality values and then the BS 101 may determine the prioritization. Hence, the logic for determining the prioritization may be residing at the UE 103 at some examples and at least partially recite that the BS 101 and other examples.

The BS 101 then transmits the control message 4103 to the UE 103, 3213. This is optional.

The control messages 4111, 4103 may be relayed via the UE 103.

Figure 20:
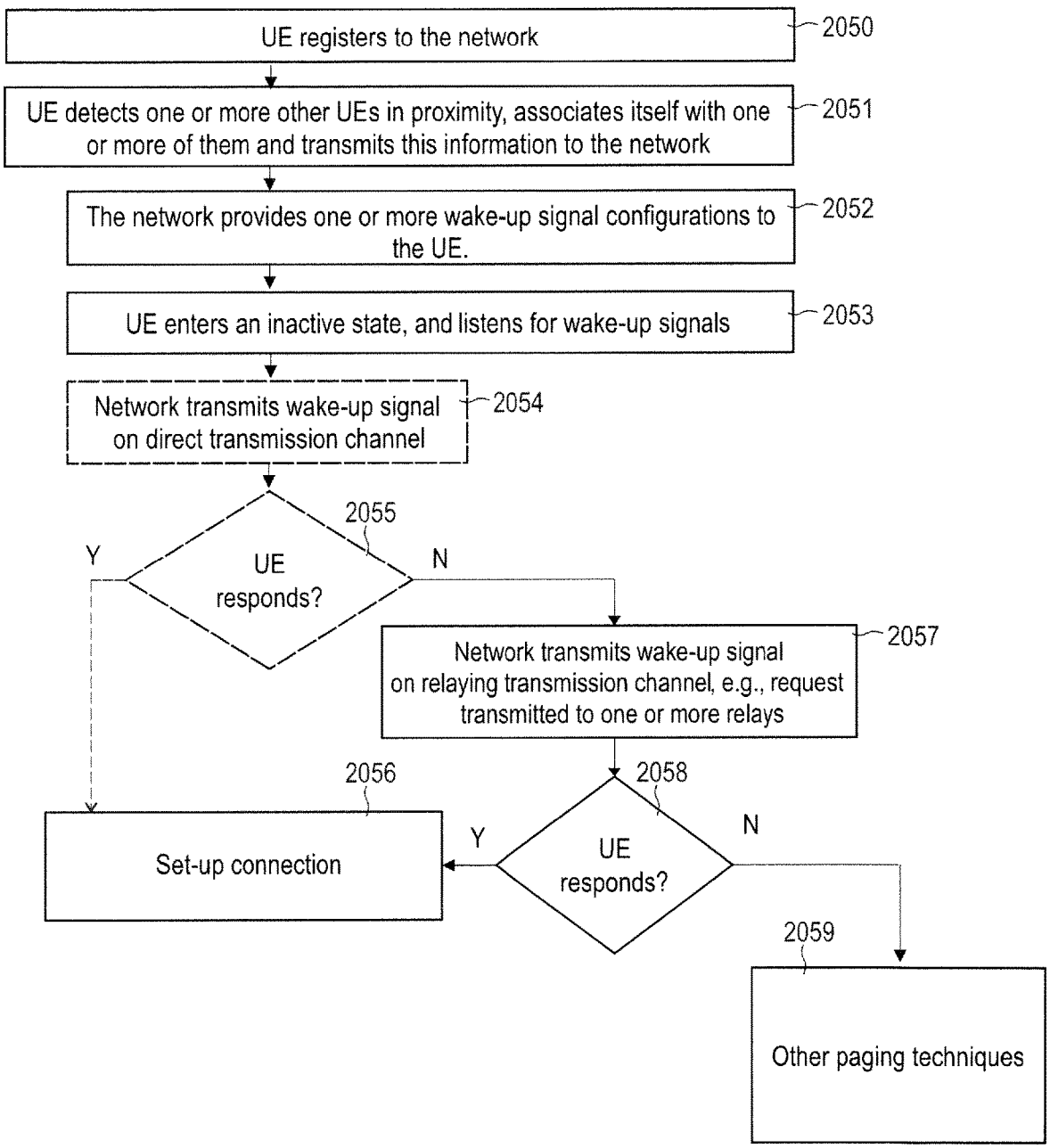
FIG. 20 is a flowchart of a method according to various examples.

FIG. 20 is a flowchart of a method according to various examples. In 2050, the UE 103 registers to the network 100. A data connection 160 can be set up. A random access procedure may be executed in 2050. A RRC set up procedure may be executed in 2050.

Next, in 2051, the UE 103 detects available remote UEs 102 within the proximity that may provide for relaying of wake-up signals. Different scenarios are in principle possible for detecting the available remote UEs 102.

In a first example, the UE 103 transmits a general request upon available UEs 102 within the proximity. The available candidate UEs 102 answer and provide the ability to relay a wake-up signal 4013. Here, D2D discovery 4101 may be employed.

In a second example, the BS 101 keeps track of the available candidate UEs 102 for relaying wake-up signals 4013 to UE 103 in the proximity of the UE 103 based on the current known location. Hence, the BS 101 may determine a location of the available candidate UEs 101 for relaying the wake-up signals 4013 to the UE 103 and the location of the UE 103 and may select the relaying link 182 based on a distance between the locations. For example, the candidate UE 102 closest to the UE 103 may be selected for relaying the wake-up signals 4013.

In a third example, the system keeps a list of available candidate UEs 102 for relaying wake-up signals 4013 based on the history of which UEs 102 have been located at the same location or cell and have been performing handovers to other cells simultaneously with the UE 103. Hence, the locations of the candidate UEs 102 and the UE 103 may be determined based on prior knowledge.

In a fourth example, it would also be possible that detection of available candidate UEs 102 for relaying wake-up signals 4013 to UE 103 is user initiated. For example, such an association may be done by Near Field Communication (NFC) attached.

In a fifth example, it would be possible that detection of available candidate UEs 102 for relaying wake-up signals 4013 is based on a list of user accounts registered on a user or a group of users, e.g., family, company organization.

In a sixth example, it would be possible that each candidate UE 102 transmits, to the BS 101, an indication whether D2D communication with the UE 103 is possible or not.

Such examples for detecting nearby candidate UEs 102 for relaying wake-up signals are non-exhaustive in further examples are conceivable. In some of the examples, the UE 103 then transmits a control message indicative of one or more UEs 102 in the vicinity which are candidates for relaying wake-up signals 4013.

Next, at 2052, the network 100 transmits a control message which is indicative of one or more wake-up signal configurations. For example, this may correspond to the control message 4103. The wake-up signal configuration may include, but is not limited to: reoccurring time-frequency resources 202; identity code; signal design such as preamble information, spreading factor, etc. It is possible that the control message communicated at 2052 is indicative of a plurality of wake-up signal configurations. If the network 101 provides more than one wake-up signal configuration, different wake-up signals—i.e., using different signal configurations may be transmitted on different communication links 181, 182. For example, a first wake-up signal may be transmitted on the direct link 181, when a second wake-up signal having a different signal configuration if compared to the first wake-up signal is transmitted on one or more relaying links 182.

Then, at 2053, the main receiver 1051 of the UE 103 enters an inactive state. The UE may change to an idle mode, e.g., RRC inactive. The UE 103 then employs a low-power receiver 1352 which may or may not be a separate receiver hardware if compared to the receiver hardware. The UE 103, using the low-power receiver 1352, listens for wake-up signals 4003, 4013 in accordance with the signal configurations provided in 2052. Hence, the UE 103 may listen for multiple wake-up signals 4003, 4013 transmitted using different timings—e.g., different periodicities 251, 252—and/or transmitted on different frequencies.

It would be possible that the UE 103—prior to transitioning the main receiver 1351 into the inactive state 304, 305—transmits a control message to the network 100 which is indicative of a prioritization of communication links 181, 182 (not illustrated in FIG. 20). Hence, the UE 103 may indicate whether reception of wake-up signals 4003, 4013 is preferred using direct communication 191, 192; or is preferred using D2D communication 195, 196.

If one or more wake-up signals 4003 are transmitted by the BS 101 on the direct link 181, transmission of the one or more wake-up signals 4003 may be triggered in accordance with the provided wake-up signal configuration. See block 2054.

At 2055 it is checked whether a response from the UE is received. Such a response from the UE 103 may correspond to the random access procedure performed by the UE 103. Then, the data connection may be set up at 2056.

If, however, at 2055 it is judged that no response is received from the UE 103, the network 100 can transmit a control message—e.g., the scheduling control message 4050—to one or more of the associated UEs 102 for triggering transmission of a wake-up signal 4013 on the relaying link 182. For example, a request control message may be communicated to one or more of the associated relaying UEs 102, the request control message triggering the respective UEs 102 to transmit one or more wake-up signals 4013 according to the wake-up signal configuration. See block 2057. In other examples, lower-layer relaying could be employed where the BS generates the sequence of the wake-up signal which is then repeated and amplified by the relaying UE 102.

Again, at 2058 it is checked whether a response from the UE 103 is received, e.g. a random access procedure or any other type of response signaling. If this is the case, then at 2056 the data connection 160 is set up. Otherwise, other paging techniques may be employed at 2059.

As will be appreciated from FIG. 20, it is possible that the BS 101 monitors for response transmitted by the UE 103 in response to triggering transmission of one or more wake-up signals 4003 on the direct link 181. Then, triggering of transmission of one or more wake-up signals 4013 on the relaying link 182 may be selectively executed depending on said monitoring. See NO-branch between blocks 2055 and 2057.

In FIG. 20, a scenario is illustrated in which transmission of the wake-up signal is first attempted via the direct link. However, generally, it is not required to transmit the wake-up signal via the direct link. Thus, 2054 and 2055 are optional (indicated by the dashed lines in FIG. 20).

Summarizing, above techniques have been described which enable to implement multiple communication links for transmission of wake-up signals in a relay-based network architecture. By the techniques described herein, a higher probability for a UE to be reached when operating in an inactive state using a low-power receiver can be provided. This may be especially true for such UEs which have a low mobility or UEs which have a similar mobility pattern to one or more further UEs which may act as a relay device for relaying wake-up signals, e.g., a user-held smartphone and a user-related wearable UE. According to the techniques described herein, a flexibility to design different wake-up signal configurations is provided. For example, the wake-up signal configuration may be determined based on the transmitter employed for transmitting wake-up signals, e.g., at a relaying device. For example, it would be possible to allow for different frequencies to be used for transmitting different wake-up signals on different communication links.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For further illustration, while above various examples have been described with respect to the 3GPP LTE protocol, in other examples, other protocols may be employed.

For further illustration, above, various examples have been described where the wake-up signal is received by a low-power receiver. Such techniques may be likewise employed in a scenario where there is no dedicated low-power receiver, but a main receiver which may operate in a low-power state and a high-power state. Then, the wake-up signal may be received in the low-power state of the main receiver. The various examples described herein may all benefit from such a receiver architecture including only the main receiver.

For further illustration, above various examples have been described where the wake-up signals are communicated via, both, a direct link and a relaying link. However, in other examples it may not be required to communicate the wake-up signals via the direct link. Here, the wake-up signals may be communicated solely via the relaying link.

The invention claimed is:

1. A method, comprising:

communicating, by a device on a network to a communication device, a control message comprising a sequence design configuration to be used for transmission of a wake-up signal along a relaying link between the network and the communication device and via a further communication device; and communicating, to the further communication device, a control message indicative of a property of a wakeup implemented by the communication device and comprising the sequence design configuration, to thereby trigger the further communication device to transmit the wake-up signal to the communication device via the relaying link using the sequence design configuration and based on the property of the wakeup implemented by the communication device.

2. The method of claim 1, further comprising:

triggering transmission of a further wake-up signal to the communication device on a direct link between the network and the communication device.

3. The method of claim 2, further comprising:

in response to said triggering of the transmission of the further wake-up signal:
monitoring for a response transmitted by the communication device to the network, wherein said triggering of the transmission of the wake-up signal is selectively executed based on said monitoring.

4. The method of claim 2, wherein:

the wake-up signal comprises a first signal configuration;

the further wake-up signal comprises a second signal configuration; and the first signal configuration is different from the second signal configuration.

5. The method of claim 4, wherein the first signal configuration is different from the second signal configuration with respect to at least one element selected from the group comprising: time-frequency radio resource; identity code; preamble; sequence design; spreading configuration; and scrambling configuration.

6. The method of claim 2, further comprising:

receiving, from the communication device, a control message indicative of a prioritization of communication links between the network and the communication device and determining timings of the transmission of the wake-up signal and the transmission of the further wake-up signal in accordance with the indicated prioritization of communication links.

7. The method of claim 2, wherein:

multiple transmissions of the wake-up signal are triggered at multiple first wake-up occasions;

multiple transmissions of the further wake-up signal are triggered at multiple second wake-up occasions; and the first wake-up occasions and the second wake-up occasions are interleaved in time-domain.

8. The method of claim 7, wherein a frequency of occurrence of the multiple first wake-up occasions is larger than a frequency of occurrence of the multiple second wake-up occasions.

9. The method of claim 1, wherein:
multiple transmissions of the wake-up signal are triggered at multiple wake-up occasions; and
the method further comprises:
triggering transmission of a scheduling control message to the further communication device via which the relaying link extends,
wherein the scheduling control message is indicative of a property of the wakeup implemented by the communication device comprising reoccurring resources of the multiple wake-up occasions.

10. The method of claim 1, further comprising:
receiving, from the communication device, a control message indicative of the further communication device; and
selecting the relaying link from a plurality of candidate relaying links in accordance with the indicated further communication device,
wherein the relaying link is via the further communication device.

11. The method of claim 1, further comprising:
determining a location of the communication device;
determining a location of the further communication device; and
selecting the relaying link from a plurality of candidate relaying links based on a distance between the location of the communication device and the location of the further communication device,
wherein the relaying link is via the further communication device.

12. The method of claim 1, further comprising:
in response to triggering transmission of the wake-up signal:
triggering transmission of a paging signal to the communication device on a direct link between the device on the network and the communication device.

13. The method of claim 1, further comprising:
transmitting the wake-up signal to a low-power receiver of the communication device for transitioning a main receiver of the communication device from an inactive state to an active state.

14. A method, comprising:
in a communication device, receiving, from a device of a network, a control message comprising a sequence design configuration to be used for transmission of a wake-up signal along a relaying link between the network and the communication device and via a further communication device; and
receiving the wake-up signal transmitted from the further communication device on the relaying link using the sequence design configuration and during at least one wake-up occasion in accordance with a scheduling control message of the sequence design configuration indicative of a property of a wakeup implemented by the communication device for the at least one wake-up occasion.

15. The method of claim 14, further comprising:
detecting a plurality of further communication devices using device-to-device communication, wherein the plurality of further communication devices comprises the further communication device; and
transmitting a control message indicative of the plurality of further communication devices to the network.

16. The method of claim 14, further comprising:
sensing a signal quality of device-to-device communication between the communication device and the further communication device; and
based on the signal quality:
transmitting a control message indicative of a prioritization of communication links between the network and the communication device.

17. The method of claim 14, wherein:
the wake-up signal is received by a low-power receiver of the communication device; and
the method further comprises:
in response to receiving the wake-up signal:
transitioning a main receiver of the communication device from an inactive state to an active state.

18. A method, comprising:
in a communication device, receiving, from a device of a network, a control message indicative of a property of a wakeup implemented by a further communication device and comprising a sequence design configuration of a wake-up signal to be relayed to the further communication device; and
in response to receiving the control message, using the sequence design configuration to relay, based on the property, a wake-up signal to the further communication device on a relaying link between the network and the further communication device.

19. The method of claim 18, further comprising:
receiving a scheduling control message indicative of reoccurring resources for multiple wake-up occasions,
wherein the wake-up signal is relayed multiple times at the multiple wake-up occasions and on the reoccurring resources.

20. The method of claim 18, further comprising:
detecting the further communication device using device-to-device communication; and
transmitting a control message indicative of the further communication device to the network.

* * * * *